United States Patent
Duffy et al.

(10) Patent No.: US 10,867,058 B2
(45) Date of Patent: Dec. 15, 2020

(54) METHOD AND SYSTEM FOR PROTECTING SECURE COMPUTER SYSTEMS FROM INSIDER THREATS

(71) Applicants: Niall Joseph Duffy, Mclean, VA (US); Jeffery Alan Anderson, Alexandria, VA (US)

(72) Inventors: Niall Joseph Duffy, Mclean, VA (US); Jeffery Alan Anderson, Alexandria, VA (US)

(*) Notice: Subject to any disclaimer, the term of this patent is extended or adjusted under 35 U.S.C. 154(b) by 341 days.

(21) Appl. No.: 15/857,716

(22) Filed: Dec. 29, 2017

(65) Prior Publication Data
US 2019/0205555 A1    Jul. 4, 2019

(51) Int. Cl.
| | |
|---|---|
| *G06F 21/00* | (2013.01) |
| *G06F 21/62* | (2013.01) |
| *G06F 21/60* | (2013.01) |
| *H04L 9/32* | (2006.01) |
| *H04L 29/06* | (2006.01) |
| *H04L 9/08* | (2006.01) |
| *G06F 21/40* | (2013.01) |

(52) U.S. Cl.
CPC .......... *G06F 21/6218* (2013.01); *G06F 21/40* (2013.01); *G06F 21/604* (2013.01);
(Continued)

(58) Field of Classification Search
CPC ........ G06F 21/31; G06F 21/33; G06F 21/335; G06F 21/40; G06F 21/60; G06F 21/602;
(Continued)

(56) References Cited

U.S. PATENT DOCUMENTS

| | | |
|---|---|---|
| 6,189,032 B1 | 2/2001 | Susaki |
| 7,519,560 B2 | 4/2009 | Lam |
| (Continued) | | |

FOREIGN PATENT DOCUMENTS

| | | |
|---|---|---|
| EP | 0328232 A2 | 8/1989 |
| EP | 2711861 A1 | 3/2014 |

OTHER PUBLICATIONS

Potter, Two-Person Control Administration: Preventing Administration Faults through Duplication, Large Installation System Administration Conference, Nov. 4, 2009, Baltimore, MD. USA.
(Continued)

*Primary Examiner* — Edward Zee

(57) ABSTRACT

A method to enforce compliance with multiple-person-control rules in a secure-computing system to protect against the insider threat. The method can be patched onto an existing secure computer systems to provide granular control of any type of resource request. Existing user-user access controls are configured to prevent users from gaining unfettered access. Tasks requiring higher privilege, such as system administration, are performed under the present method of multiple-person controls, using digital signatures of resource requests to provide a separate layer of protection. A script running with sufficient privilege executes resource requests requiring privilege elevation, but only after validating a first digital signature signed by a requester and validating one or more additional digital signatures signed by reviewers. To detect playback attacks, a nonce can be included in the signed message and compared with nonce values from previously processed resource requests.

26 Claims, 27 Drawing Sheets

(52) U.S. Cl.
CPC .......... *H04L 9/0894* (2013.01); *H04L 9/3247* (2013.01); *H04L 9/3263* (2013.01); *H04L 63/0823* (2013.01); *H04L 63/0853* (2013.01); *H04L 63/0861* (2013.01); *H04L 63/0884* (2013.01); *H04L 63/10* (2013.01); *H04L 63/20* (2013.01)

(58) Field of Classification Search
CPC .... G06F 21/604; G06F 21/62; G06F 21/6209; H04L 9/085; H04L 9/088
See application file for complete search history.

(56) References Cited

U.S. PATENT DOCUMENTS

| | | |
|---|---|---|
| 7,707,423 B2 | 4/2010 | Bugbee |
| 8,832,447 B2 | 9/2014 | Neumann |
| 8,966,578 B1 | 2/2015 | Belov |
| 2002/0071564 A1 | 6/2002 | Kurn |
| 2017/0063531 A1* | 3/2017 | Sullivan .............. G06F 21/6209 |

OTHER PUBLICATIONS

Air Force Instruction 91-104, Nuclear Surety Tamper Control and Detection Programs, Apr. 23, 2013,USA.
The Keyed-Hash Message Authentication Code (HMAC), Jul. 2008, National Institute of Standards and Technology, Department of Commerce, Gaithersburg, MD, USA.
Red October: CloudFlare's Open Source Implementation of the Two-Man Rule, Nov. 23, 2013, Nick Sullivan.
NIST Special Publication 800-132, Recommendation for Password-based Key Derivation, Part 1: Storage Applications, Dec. 2010, Meltem Sönmez Turan, Elaine Barker, William Burr, and Lily Chen.
FIPS PUB 186-4, Digital Signature Standard, Jul. 2013.

* cited by examiner

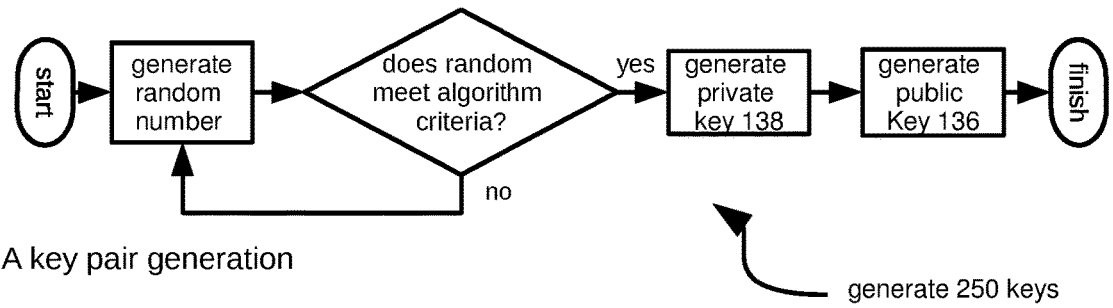
Fig 7A key pair generation
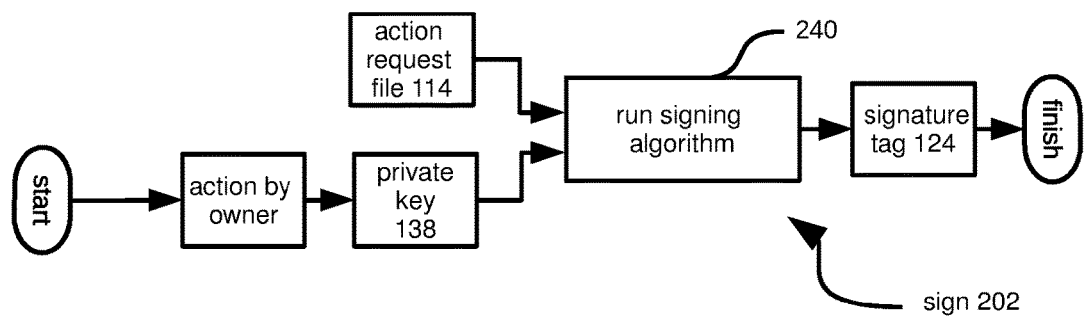
Fig 7B asymmetric-key signing
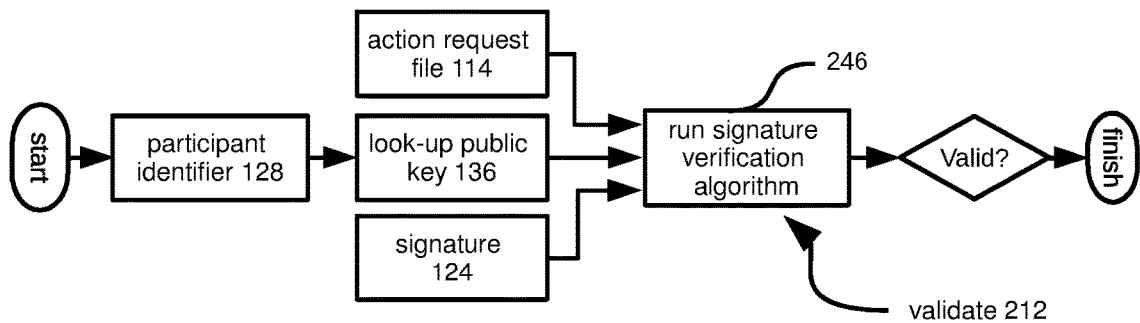
Fig 7C asymmetric-key signature validation

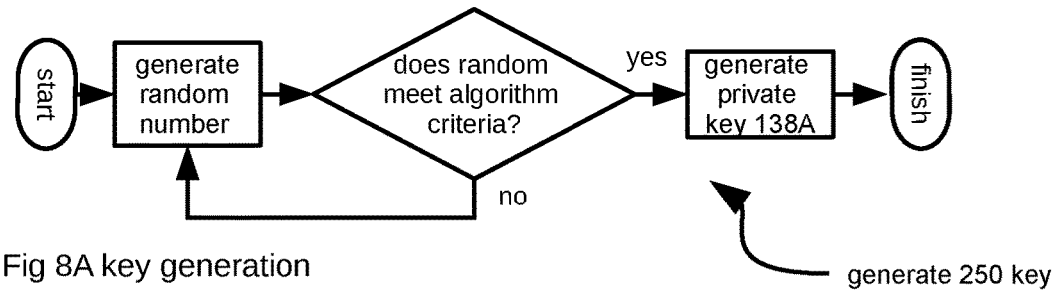
Fig 8A key generation
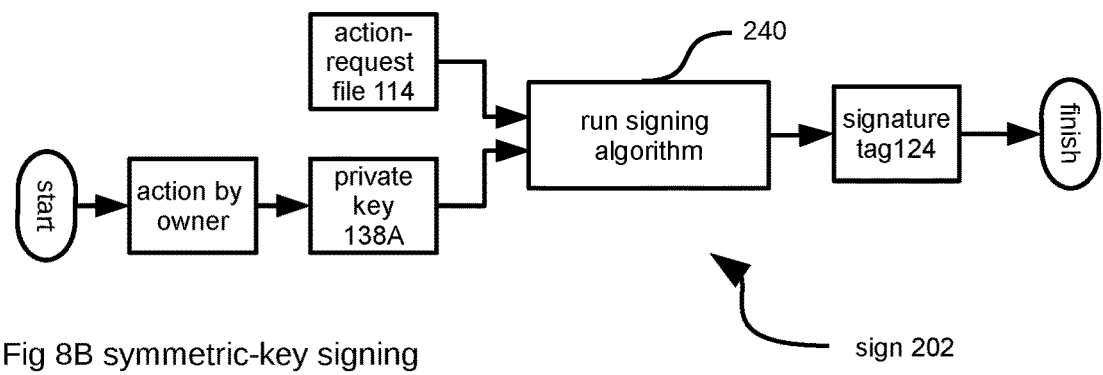
Fig 8B symmetric-key signing
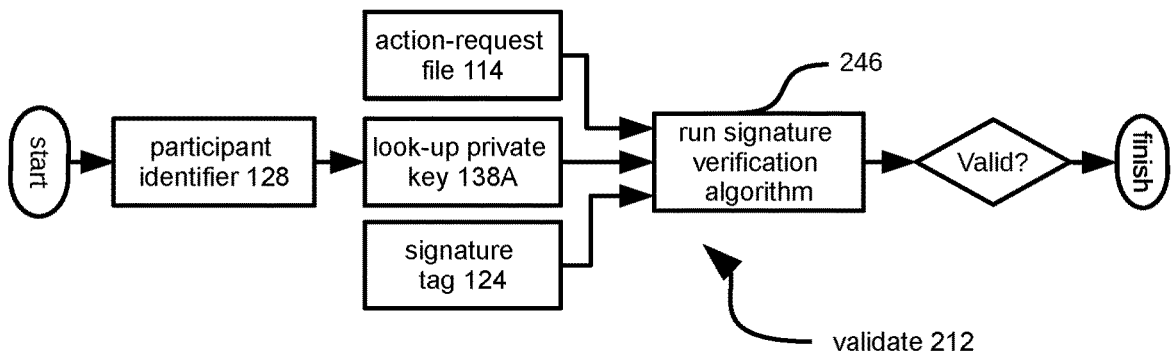
Fig 8C symmetric-key signature validation table authority 154 controls who has an entry in table 152

| participant identifier 128 | public key 136 |
|---|---|
| beth | C4655 . . . DA4FB |
| tom | 14A07 . . . F725C |
| paul | 70B07 . . . 029BFA |
| edward | 8483A . . . DA772 |
| bradley | 29C73 . . .A3D20 |
| chelsea | 4FB4A . . .109BF | authorized-participant table 152

 table authority 154A controls who has an entry in table 152A
| participant identifier 128 | private key 138A |
|---|---|
| beth | C4655 . . . DA4FB |
| tom | 14A07 . . . F725C |
| paul | 70B07 . . . 029BFA |
| edward | 8483A . . . DA772 |
| bradley | 29C73 . . .A3D20 |
| chelsea | 4FB4A . . .109BF |
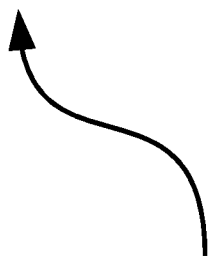
authorized-participant table 152A
Fig 18

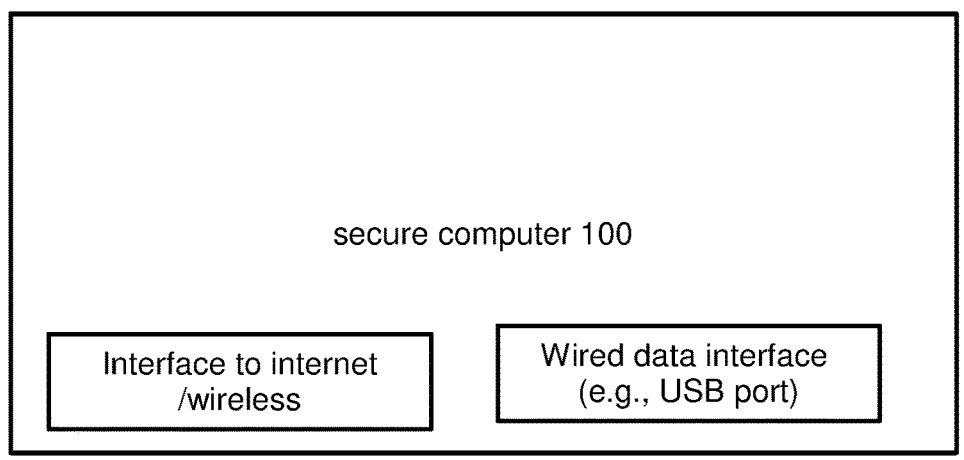
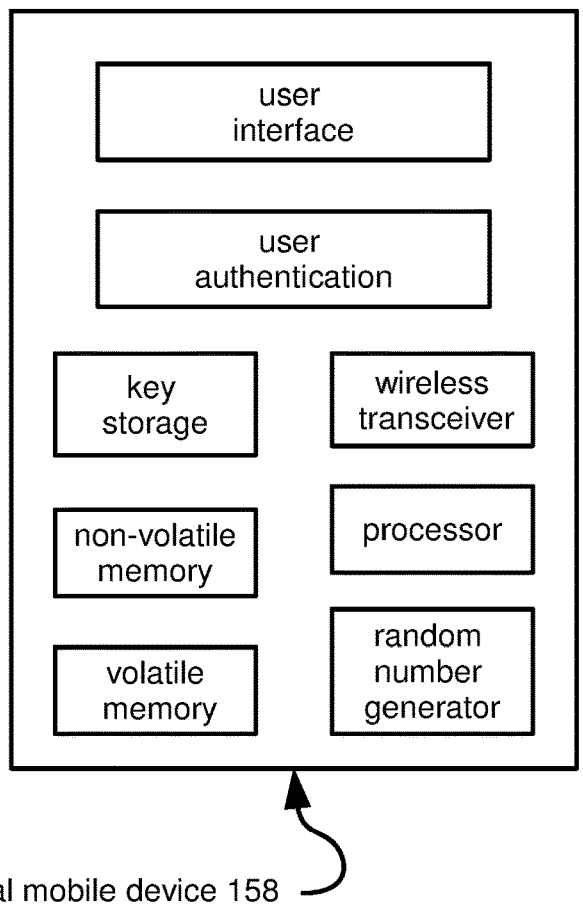
Fig 19

METHOD AND SYSTEM FOR PROTECTING SECURE COMPUTER SYSTEMS FROM INSIDER THREATS

BACKGROUND—PRIOR ART

The following is a tabulation of some prior art that presently appears relevant:

U.S. Patents

| Pat. No. | Kind Code | Issue Date | Patentee |
|---|---|---|---|
| 6189032 | B1 | 2001 Feb. 13 | Susaki et al. |
| 8966578 | B1 | 2015 Feb. 24 | Belov et al. |

Foreign Patent Documents

| Foreign Doc. Nr. | Cntry Code | Kind Code | Pub Dt. | App or Patentee |
|---|---|---|---|---|
| 2711861 | EP | A1 | 2014 Mar. 26 | Cherubini et al. |

NONPATENT LITERATURE DOCUMENTS

Air Force Instruction 91-104, "Nuclear Surety Tamper Control and Detection Programs", (23 Apr. 2013)

Potter, S; Bellovin, M; Nieh, J; "Two Person Control Administration: Preventing Administration Faults through Duplication"

"Red October: CloudFlare's Open Source Implementation of the Two-Man Rule," Nick Sullivan, available at blog.cloudflare.com, Nov. 21, 2013

FIPS PUB 186-4, Information Technology Laboratory, National Institute of Standards and Technology, "Digital Signature Standard (DSS)", (July, 2013) available at nvlpubs.nist.gov NIST Special Publication 800-132, "Recommendation for Password-Based Key Derivation", (December, 2010) available at csrc.nist.gov FIPS PUB 198-1, Federal Technology Laboratory, National Institute of Standards and Technology, "The Keyed-Hash Message Authentication Code (HMAC)", (July, 2008) available at csrc.nist.gov The objective of the present method is to protect critical data from unauthorized disclosure, modification, destruction and theft. Examples of critical data include personally identifiable information, sensitive personal information, proprietary information, medical records, financial data, and classified data. Protection is applicable to data stored on any type of a secure-computer system to include servers, database systems, corporate networks, and government networks. The focus is protection against the insider threat.

While the majority of publicized data breaches are caused by external attackers who attack computer systems remotely over communications interfaces, the most damaging attacks come from insiders. The insider threat is most evident in the cases of Bradley Manning and Edward Snowden. These government employees were given access to sensitive computer systems and then proceeded to steal the sensitive information and provide it to others. The insider threat is not limited to government information, as experts have speculated that the Target data breach was possible only with insider knowledge of the system.

The commonality between the insider threat cases is this: a trusted person is given unfettered access to a system, and the only thing stopping him from committing crimes against his employer is his integrity. As evident from the Manning and Snowden cases, it is difficult to identify trustworthy individuals and keep them trustworthy over a period of years. The United States Air Force does not leave this to chance, enforcing a rule known as the Two-Man Rule, or Two Person Concept when operating nuclear weapon systems. This rule protects against unfettered system access by a single person by splitting control authorization between two people.

U.S. Pat. No. 6,189,032 to Susaki teaches a method for defining service control policy to include select resource requests that require secondary approval. The method uses process control rules to specify whether approval from a second user is required. While the intent is to prevent unfettered access by a single user, the requirement for secondary approval is technically difficult to enforce. A rogue system administrator has a number of approaches to gain unfettered access to resources that require approval. For example, a rogue system administrator can forge a resource request from another system administrator, and then approve it himself. Alternatively, a rogue system administrator can create a resource request, and forge an approval from another system administrator. Further, a rogue system administrator can modify an approved request to undermine security policy. These are just a few of the attack vectors available to a rogue system administrator to gain control of secondary approval policy. In summary, the method of Susaki provides protection, but has a large attack surface by which a rogue insider can gain unfettered access.

The ISE-T (I See Everything-Twice) system, developed by Potter et al, teaches a strong method of enforcement for two-person control among system administrators. ISE-T requires two separate system administrators to perform each administration task, on separate, cloned versions of the protected computer system. Only after the behavior of the two clones have been verified to be the same are the tasks executed on the actual protected computer system. ISE-T offers a significant improvement in security but is expensive to operate, less responsive and difficult to implement. While ISE-T ensures two different system administrators execute the same, secure tasks, it is cumbersome as it requires two system administrators to do the job of one.

Red October is another method of enforcing two-person controls. It uses double encryption such that two persons are needed to decrypt data. Each data file is encrypted with a unique "data key", and each data key is double-encrypted with the confidential "key-encryption keys" of two different users. The resulting double encrypted data key is stored on the system along with the encrypted data file. To access a data file, the data key must first be decrypted using the confidential key-encryption keys of two different users, which prevents any single user from decrypting data on his own. While the system protects data confidentiality for a broad range of attacks, it does not protect against other types of insider attacks, such as data destruction, or adding a separate layer of encryption to hold data hostage. Additionally, once data is decrypted, Red October provides no further protection against misuse or compromise by a rogue insider.

U.S. Pat. No. 8,966,578 to Belov teaches a method of two-person control that uses secondary approval. While Belov's method focuses on automation to improve workflow efficiency, it also teaches a timer to restrict the time period when requests can be approved. The timer feature prevents a rogue system administrator from approving a resource request after its intended use, long after the request was made. While this adds security, it does not address attacks that impersonate another user to create a request, spoof attribution of a request to another user, impersonate another user to approve one's own request, forge requests, forge approvals, or perform unauthorized modifications to a request after it has been approved. As such, the method still has a large attack surface on which a rogue insider can gain unfettered access.

Cherubini's European patent application 2,711,861 teaches implementation in kernel space to strengthen enforcement of secondary approvals. The separation kernel is the root of trust for a secure-operating system. It is the most highly analyzed part of an operating system since serves as the foundation of security, enforcing isolation and mandatory information flow controls. To ensure correctness of kernel security functionality, the kernel should be formally verified, meaning all functionality is machine checked to identify security vulnerabilities. This is a challenging process that is feasible for only specially designed kernels. Moreover, to date, the kernels that have been formally verified are limited to those that enforce privileges of single-entities, not privileges associated with two-person access. Cherubini's kernel which enforces two-person approval-dependent privilege, is more complex, which makes a thorough formal verification unlikely to be feasible. As such, implementing two-person control logic in a kernel is likely to have numerous residual security vulnerabilities.

While the security advantages of two-person controls are well known, the majority of secure-computing systems operate without two-person controls, leaving the insider threat with unfettered access to the system. In some regards, current implementations of two-person controls can actually increase vulnerability to outsider attacks. The concern is that an untrusted person can use two-person controls to gain unfettered access. For example, instead of having to gain access to a highly privileged user account, an outsider hacker need only gain access to two medium-privilege user-accounts to perform high-privilege actions under two-person controls.

While the vulnerabilities of two-person control logic can be reduced by implementing the rules within an operating system, the resulting permission logic and privilege rules are complex, which increases risk of latent, undetected security vulnerabilities. Furthermore, existing two-person control systems are limited in regard to which types of actions require two-person control. As such, a method for implementing two-person controls is needed that leverages conventional proven, secure-operating systems, preferably using formally-verified separation kernels, and can be used to control all types of resource requests.

As such, a method of two-person controls is needed that protects against all attacks. To prevent forgeries, the method should provide assurance of non-repudiation for both resource requests and approvals. To prevent malicious modification to circumvent security policy, the method should protect the integrity of action requests. To protect against an insider threat who gains access to computer accounts of other participants, the method should not be susceptible to impersonation attacks.

The method should also be practical to implement on existing secure computer systems. It should have minimal impact to administrative work flow and manpower requirements. It should be secure even when requests and approvals are transmitted over untrusted networks. The method should be scalable to a variety of secure computing applications, from small business networks to large corporate database servers. Lastly, the method should be extensible to multiple-person control rules, in which a predetermined number of different authorized participants must approve a request before it is granted.

SUMMARY

A method in a computer system for determining compliance with two-person control rules for resource requests that is resistant to forgeries, unauthorized modification, and impersonation attacks. A requester creates a resource request, appends a nonce and creates a digital signature to assure the integrity and non-repudiation of the request. A second user reviews the request, and if approving, creates a second digital signature. A script running at a higher-privilege level grants resource requests after checking whether the nonce has been used previously, checking whether both digital signatures are valid, and checking whether the requester and the reviewer are different users. To protect against forgeries and unauthorized modification, the script denies requests if either signature is invalid, if the nonce has been previously used, or if an insufficient number of different participants have created signatures of the resource request. The method is easily extendable to support multiple-person control rules.

Advantages

Accordingly several advantages of one or more aspects of the present method are to protect against the insider threat, yet have minimal impact to system-administration work flow. The method leverages popular, proven secure-operating systems to provide an easy-to-implement method of multiple-person-control, that is simple to analyze and verify, offering a separate, independent layer of security that is scalable and reconfigurable. Public-key cryptography in combination with an existing secure operating system is used to minimize the attack surface available to the insider threat while supporting granular control of which resource requests are subject to two-person control rules. Other advantages of one or more aspects will be apparent from a consideration of the drawings and the ensuing description.

DRAWINGS—FIGURES

Figure 9:
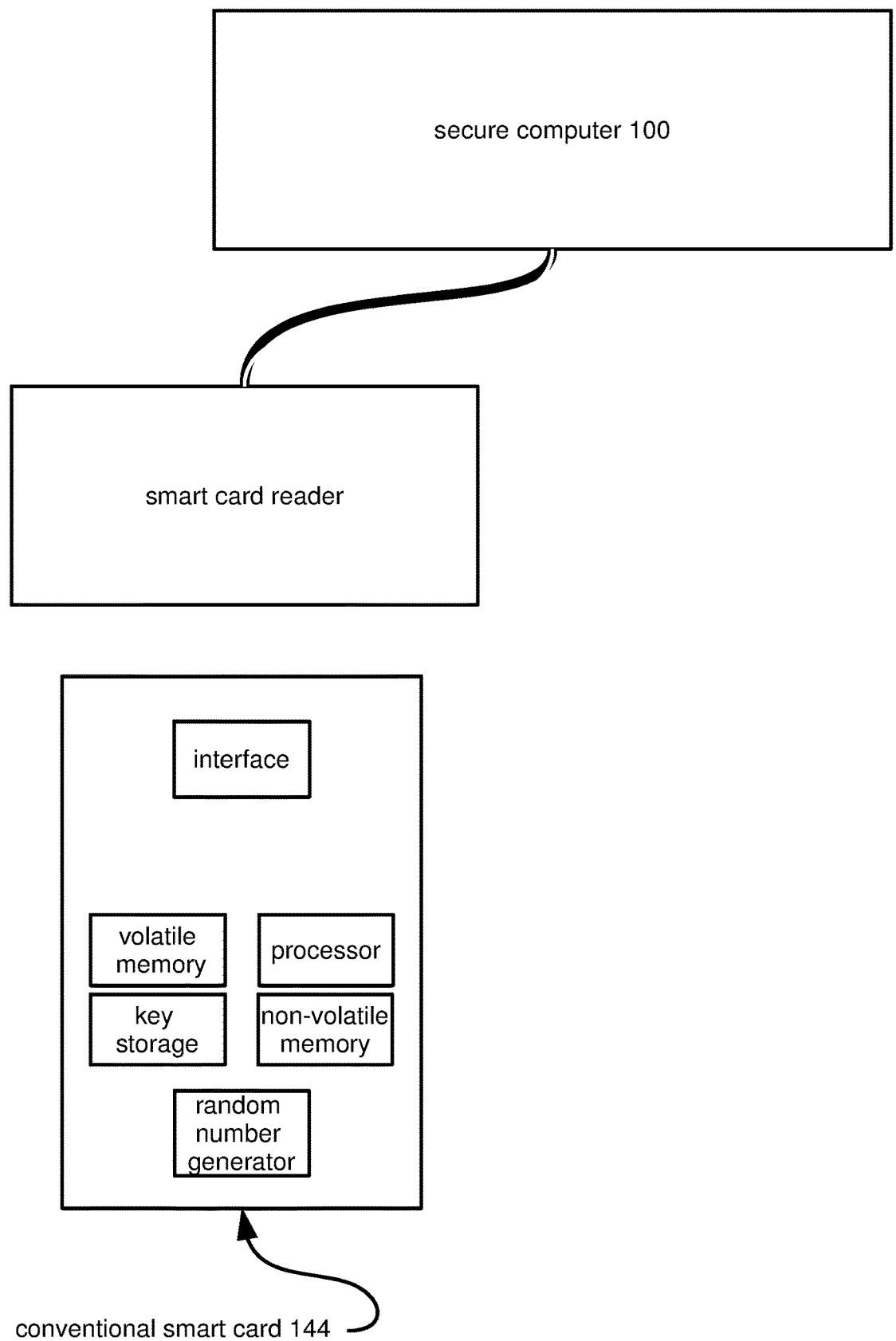
Figure 10:
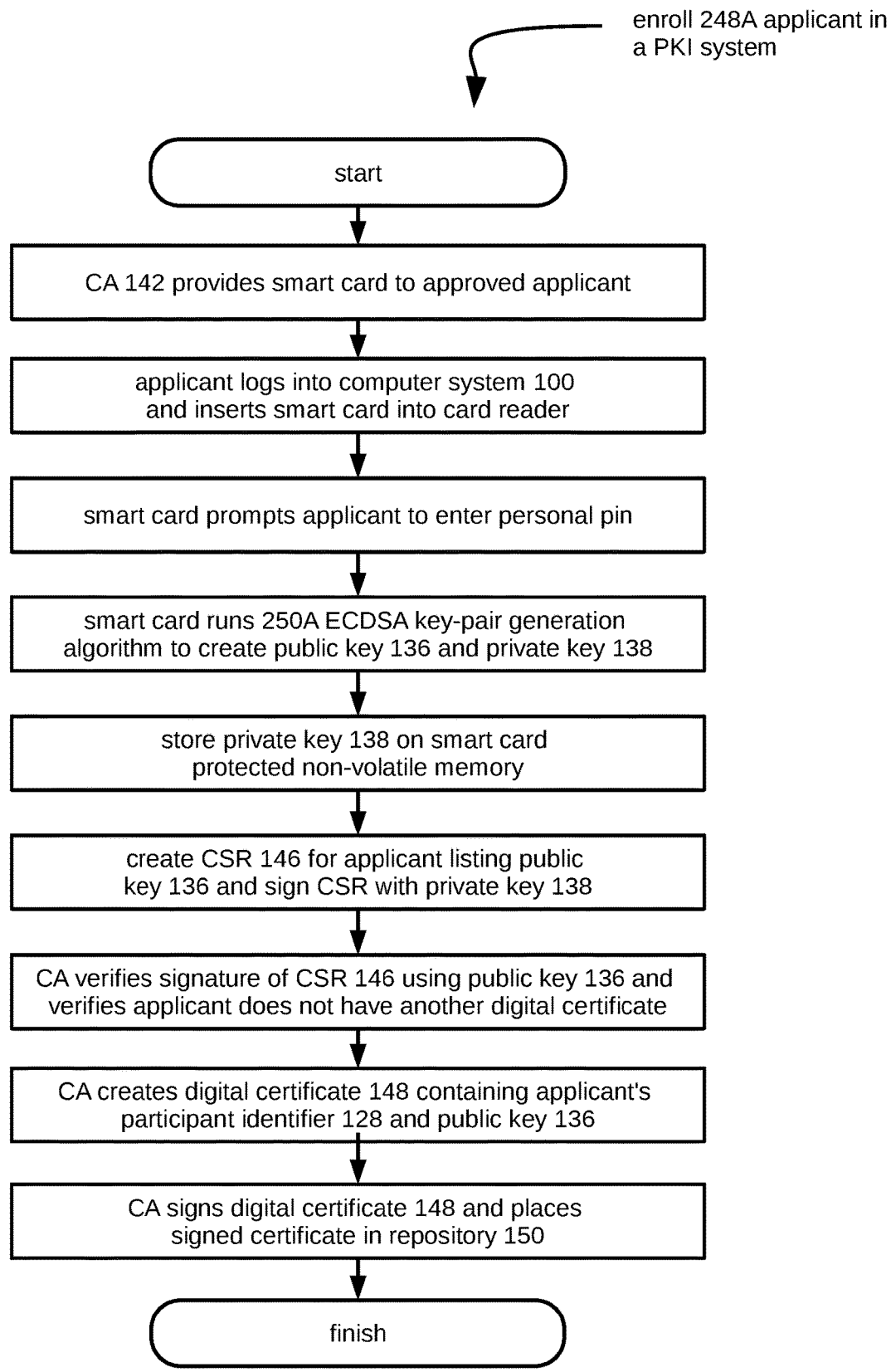
Figure 11:
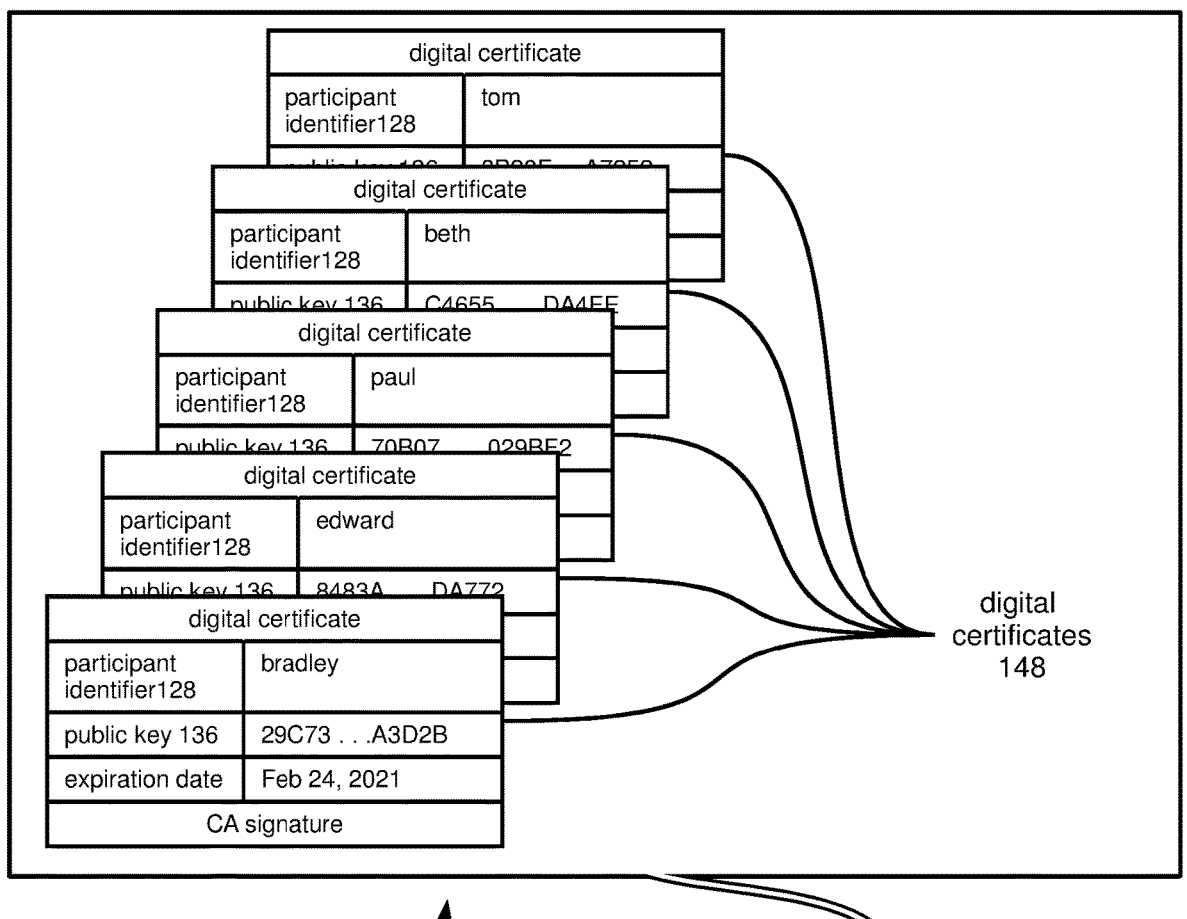
Figure 12:
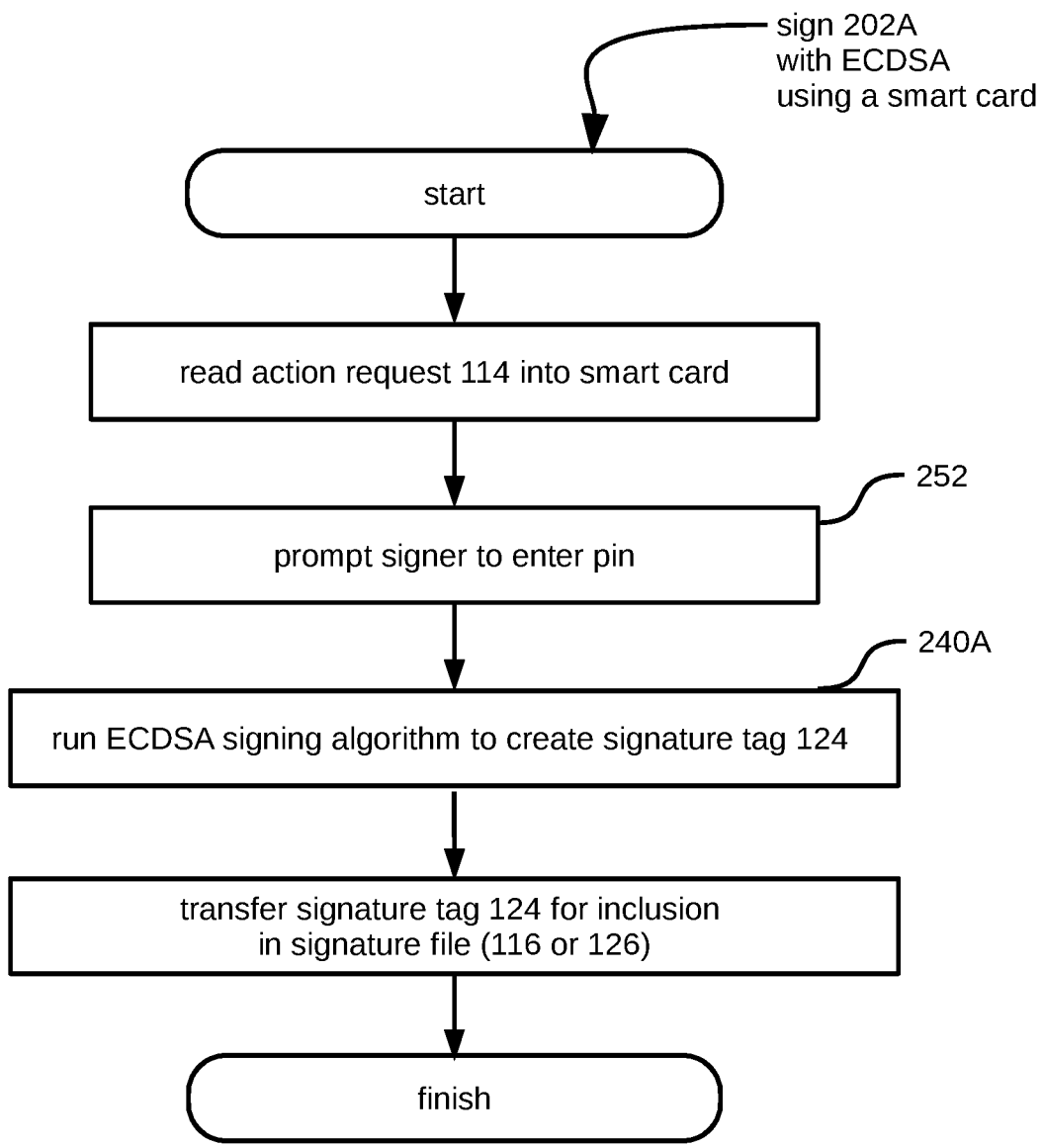
Figure 13:
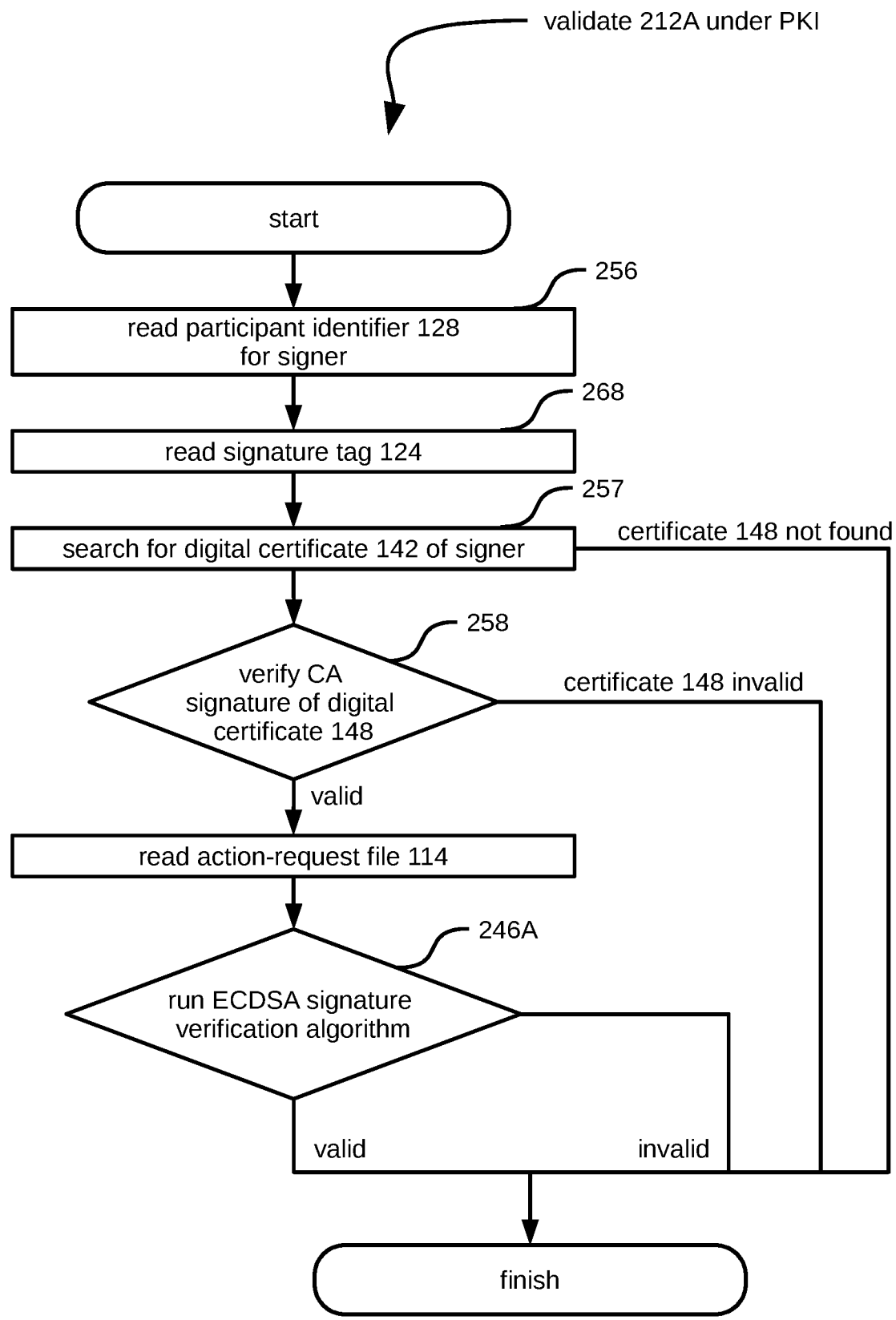
Figure 14:
Figure 15:
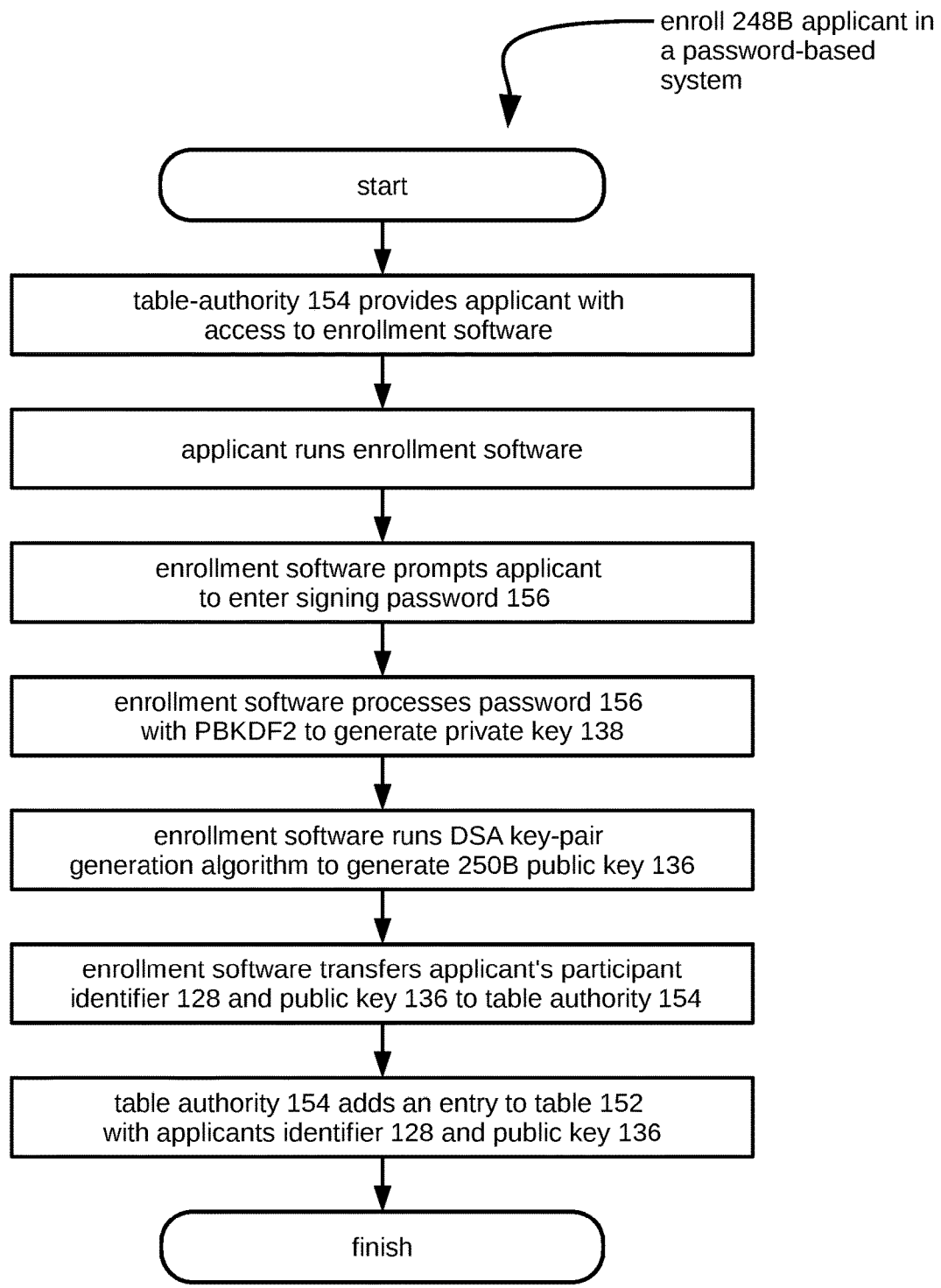
Figure 16:
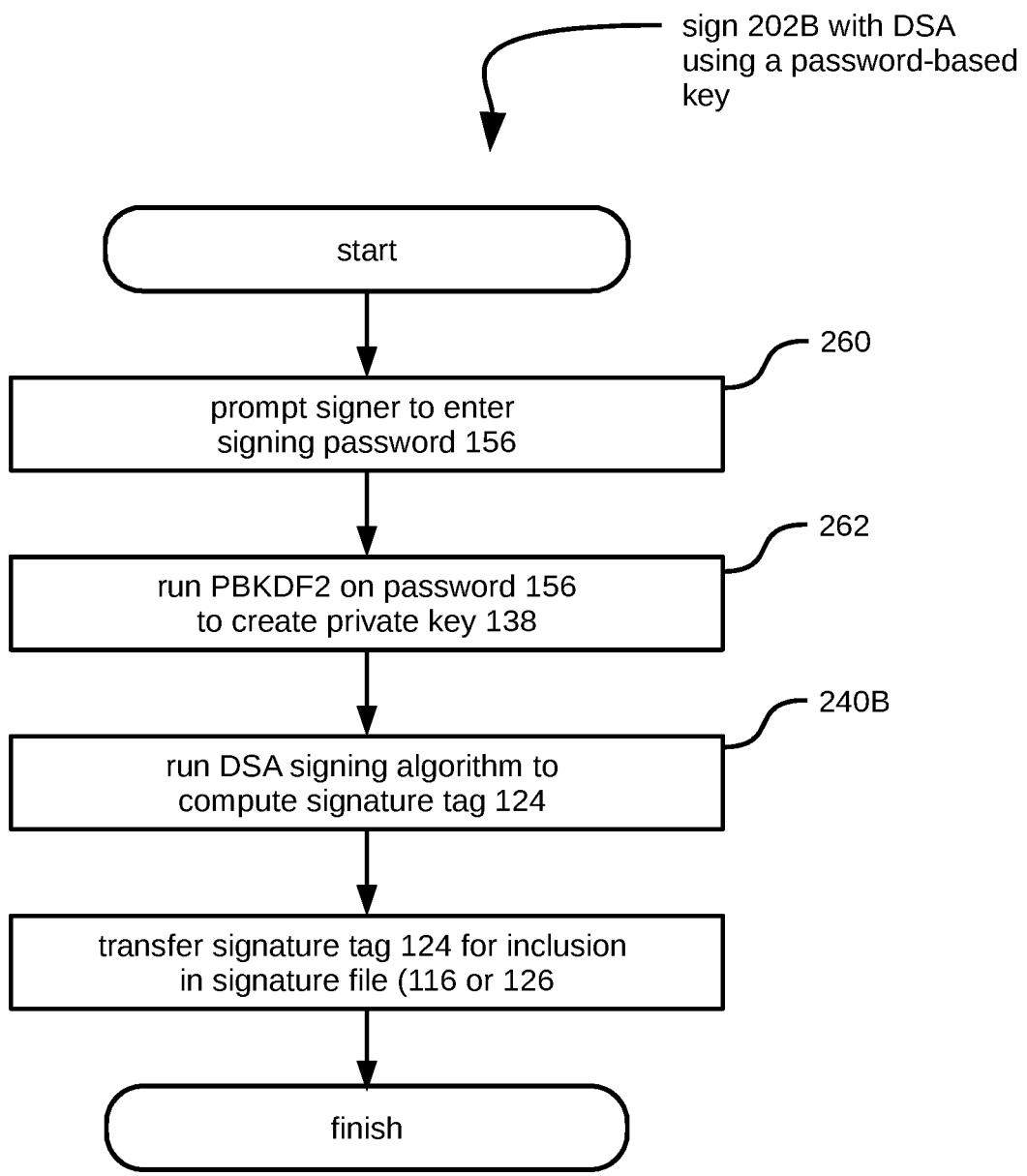
Figure 17:
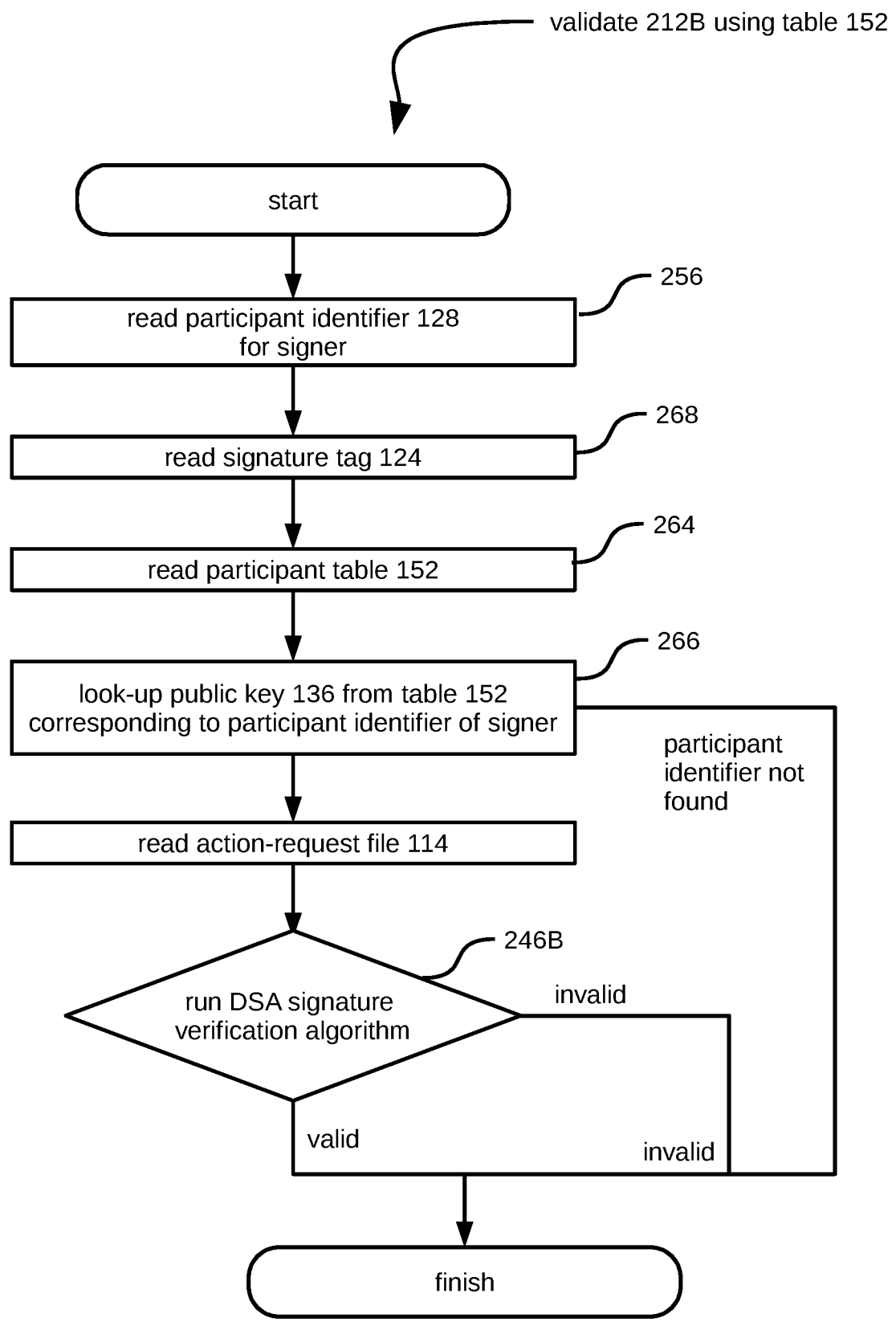
Figure 20:
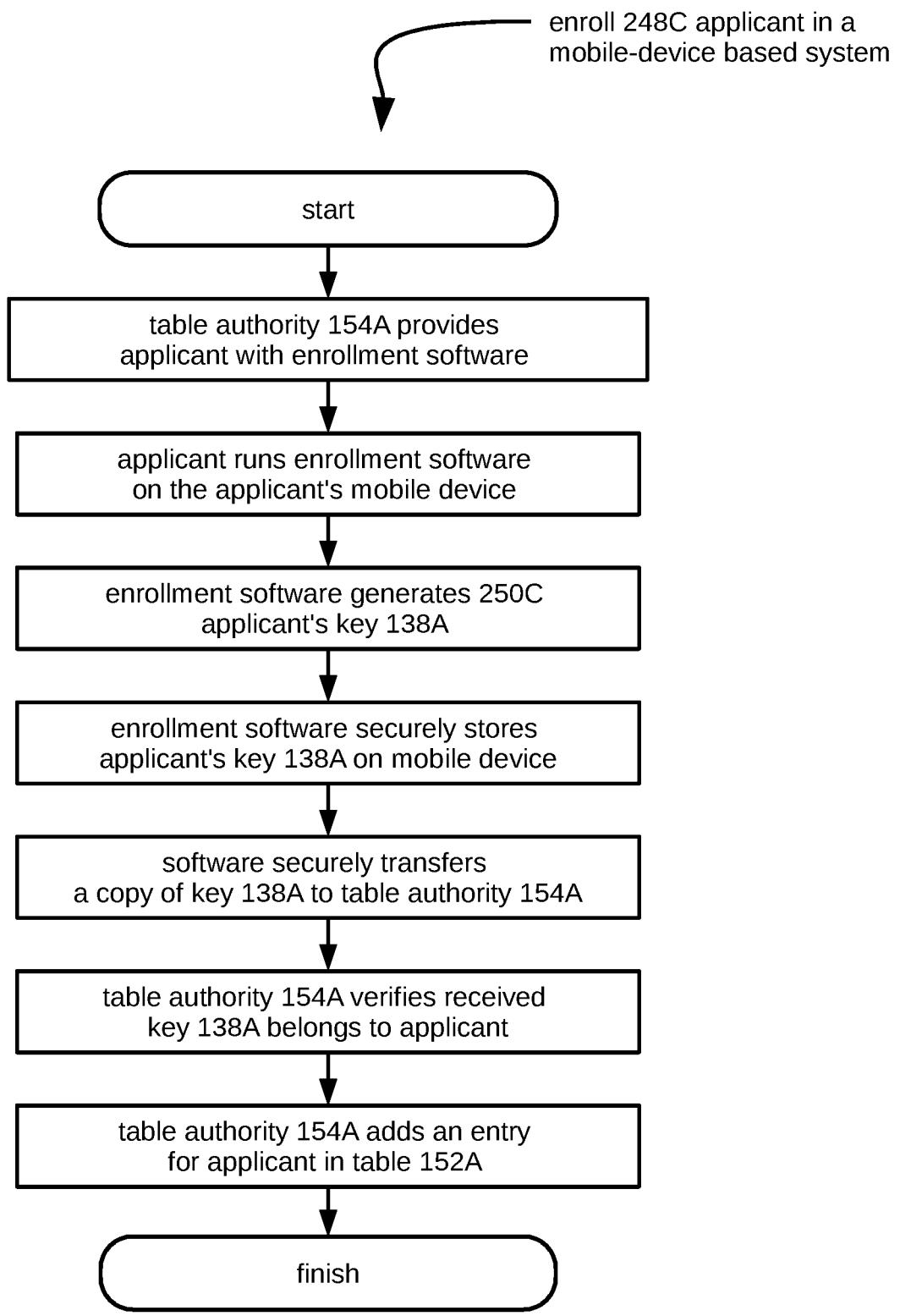
Figure 21:
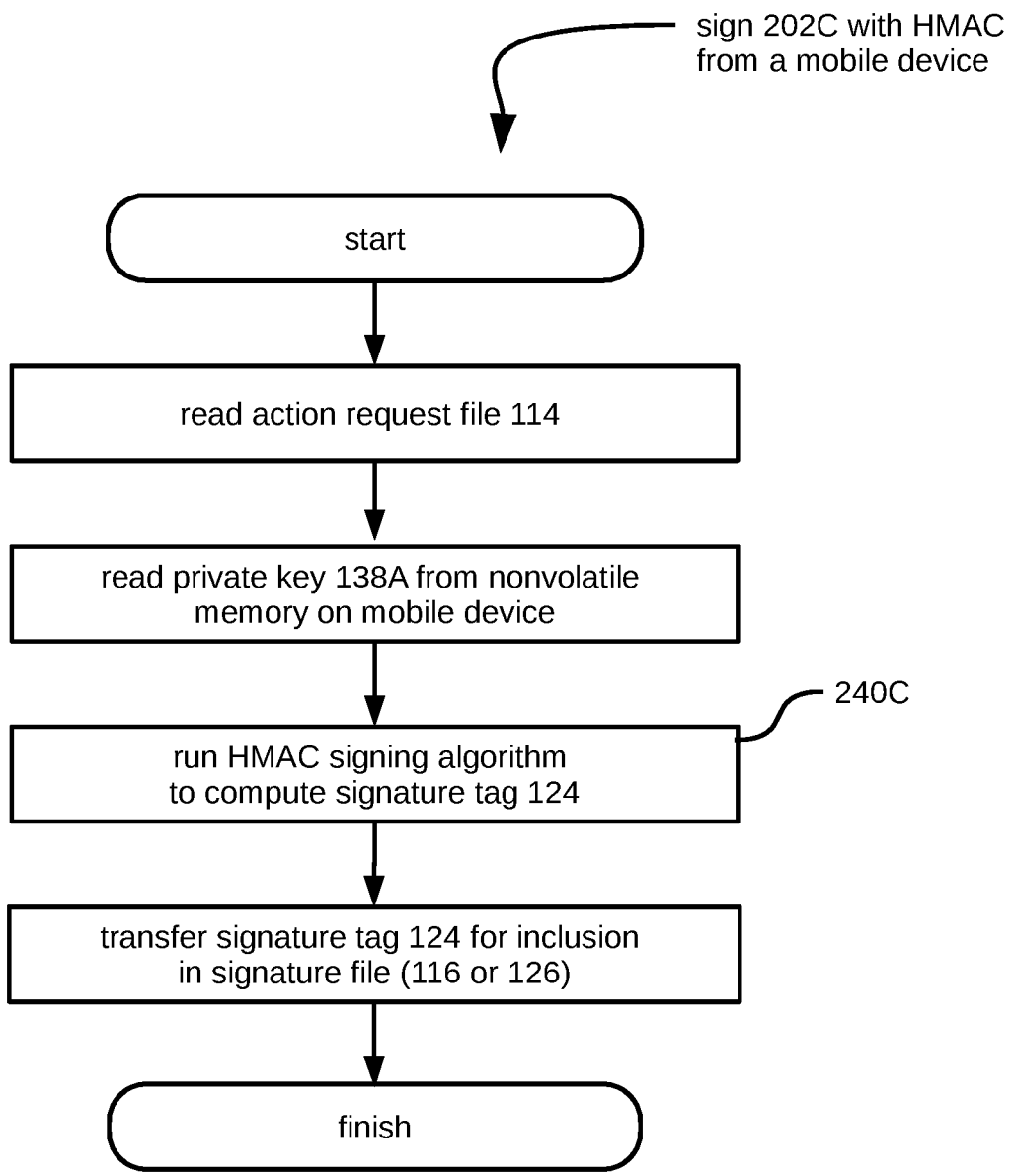
Figure 22:
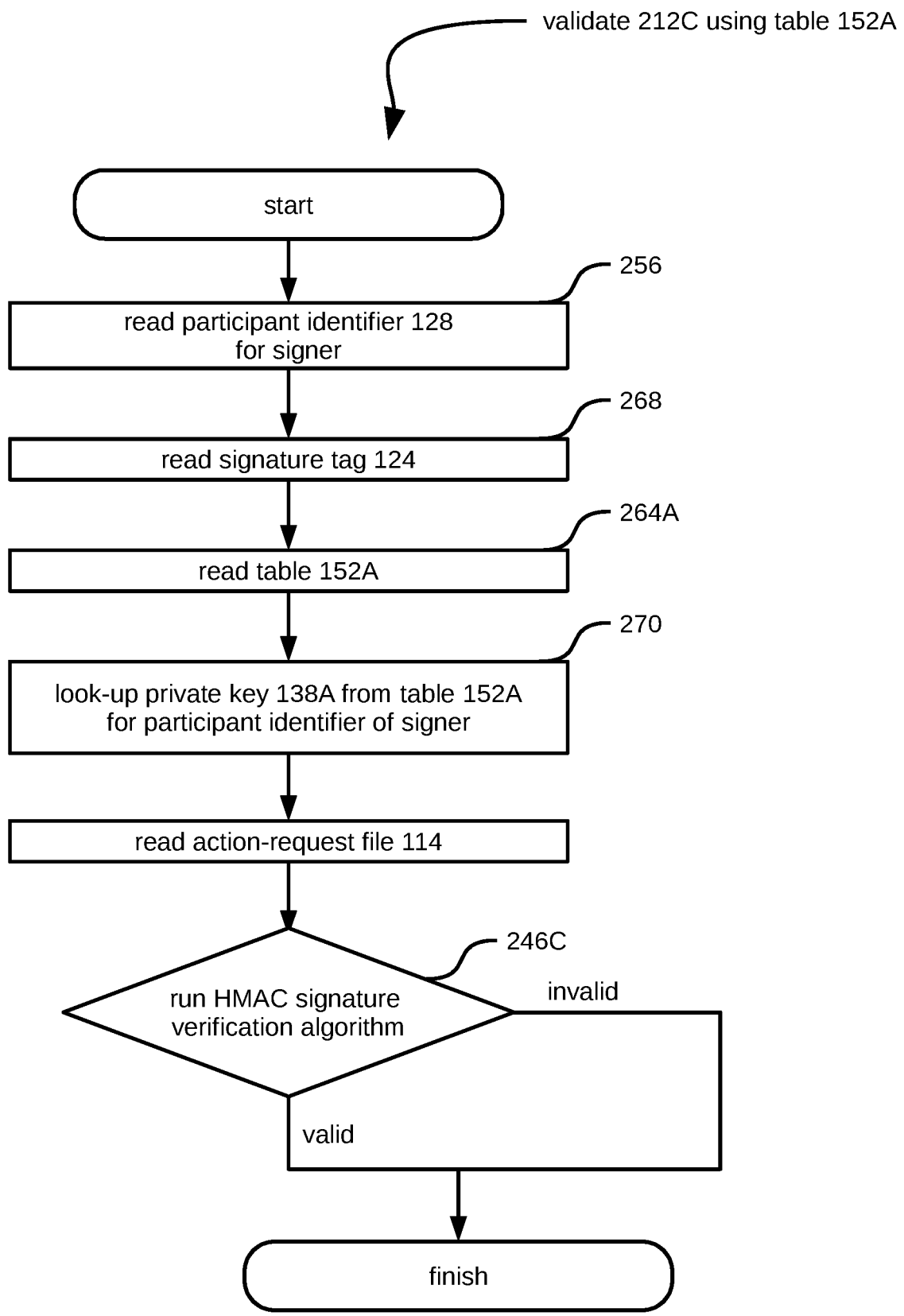
Figure 23:
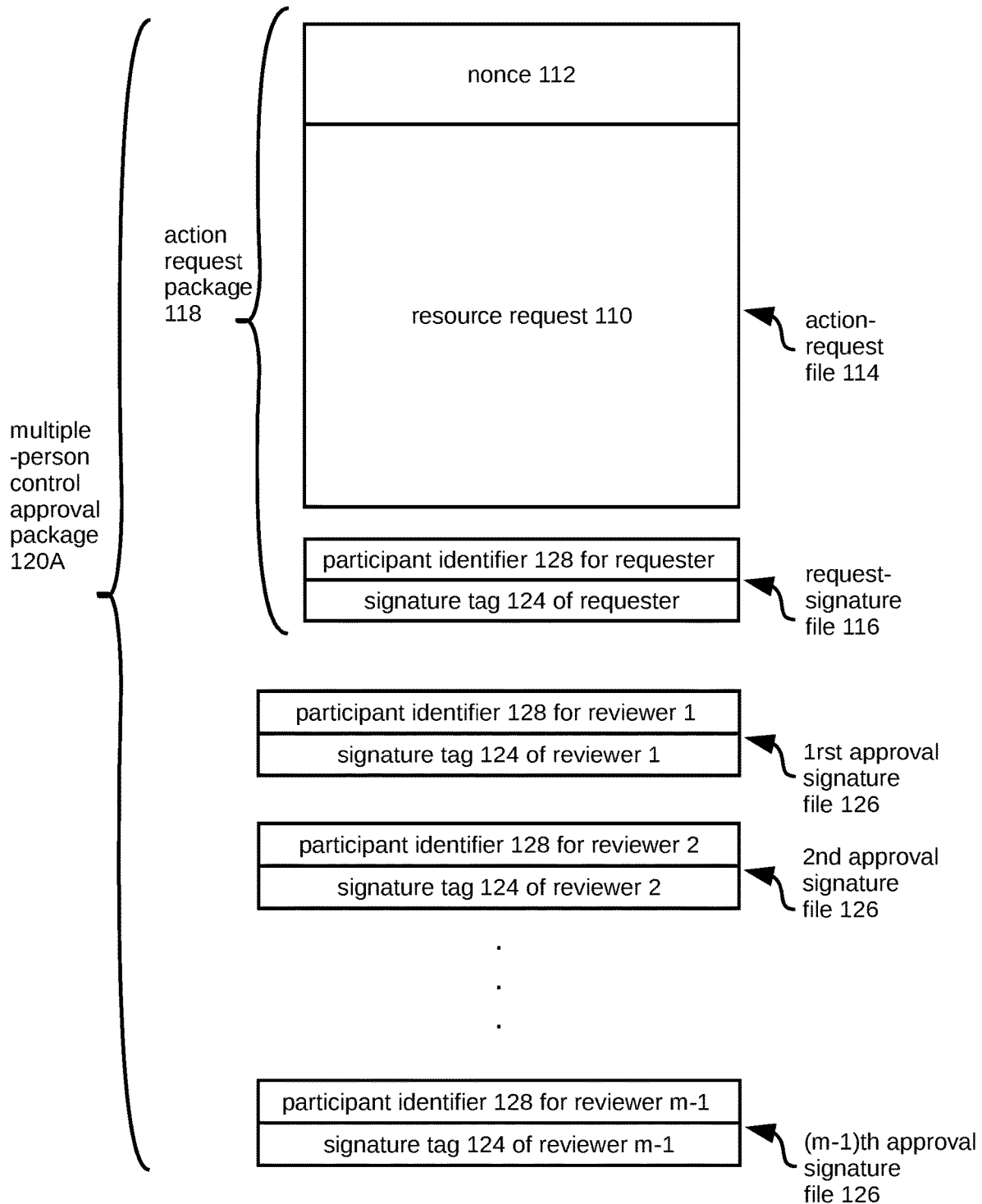
Figure 24:
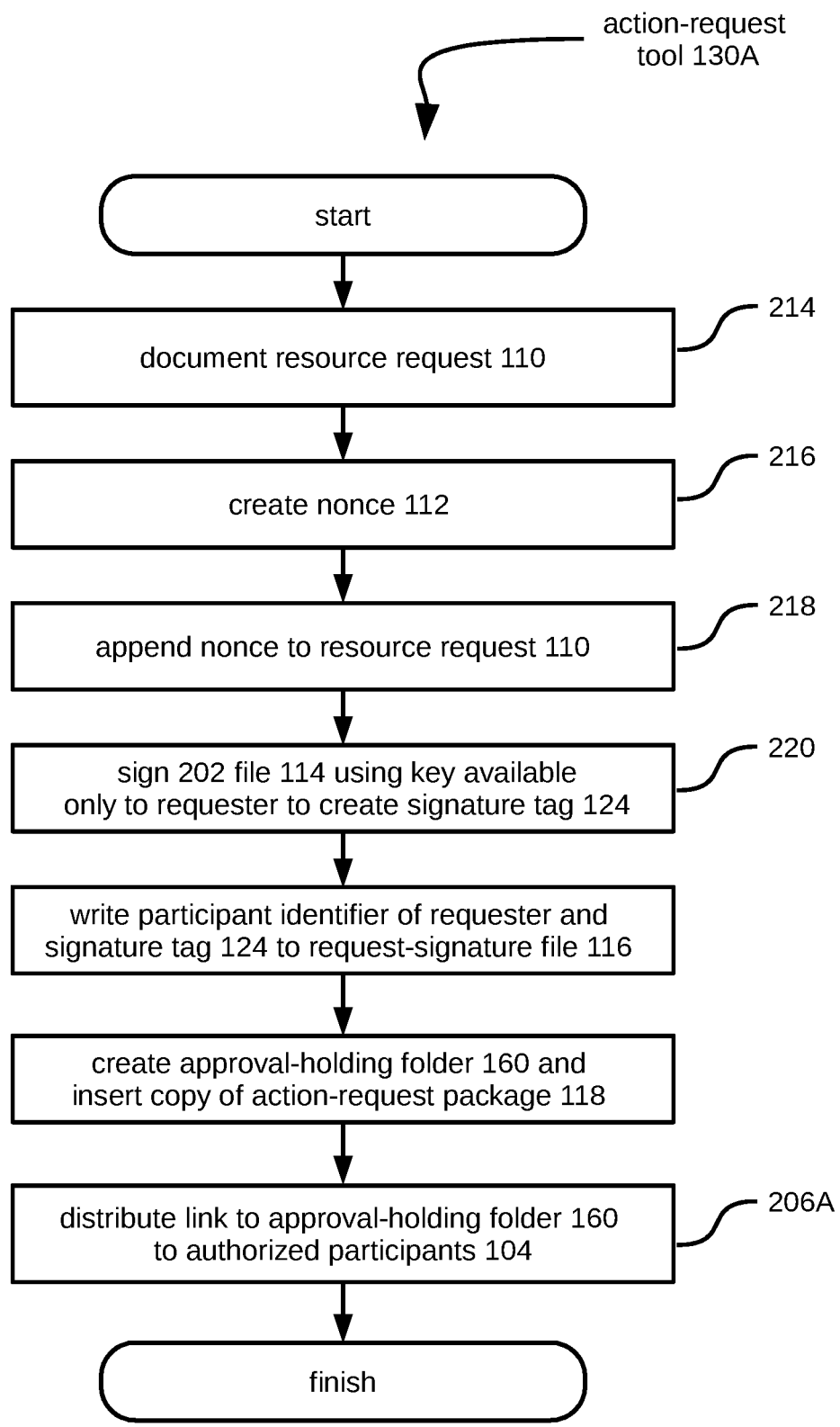
Figure 25:
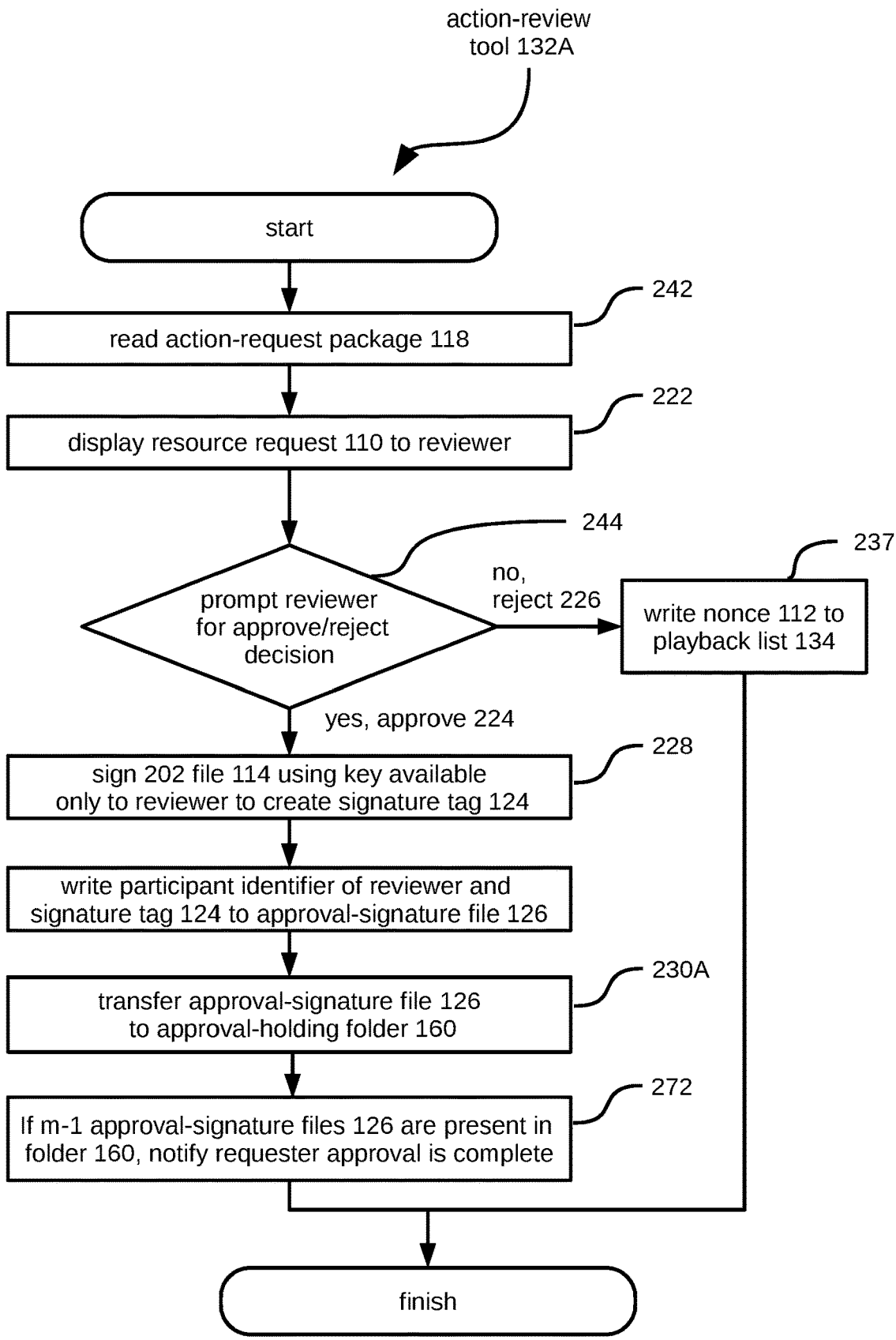
Figure 26:
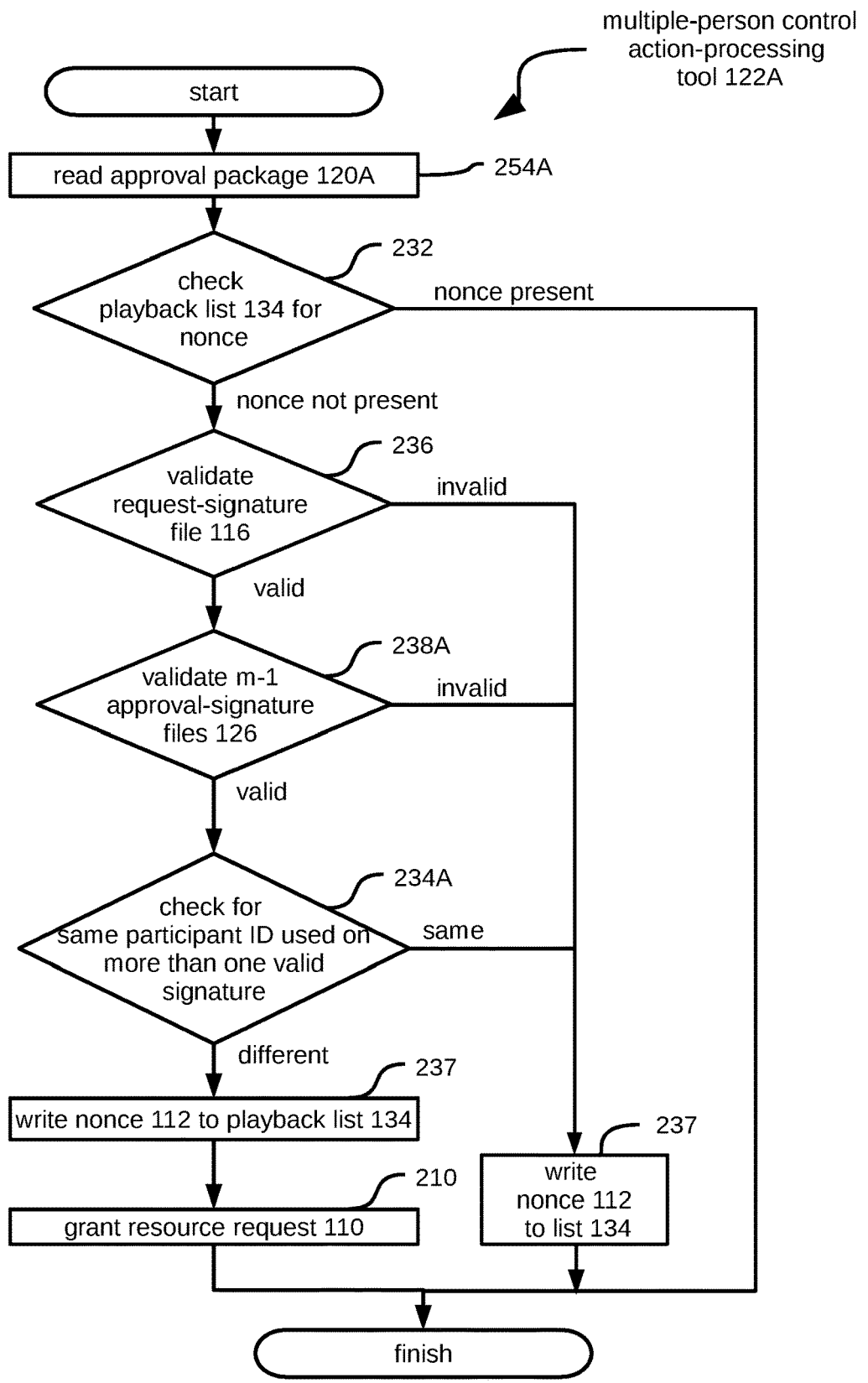
Figure 27:
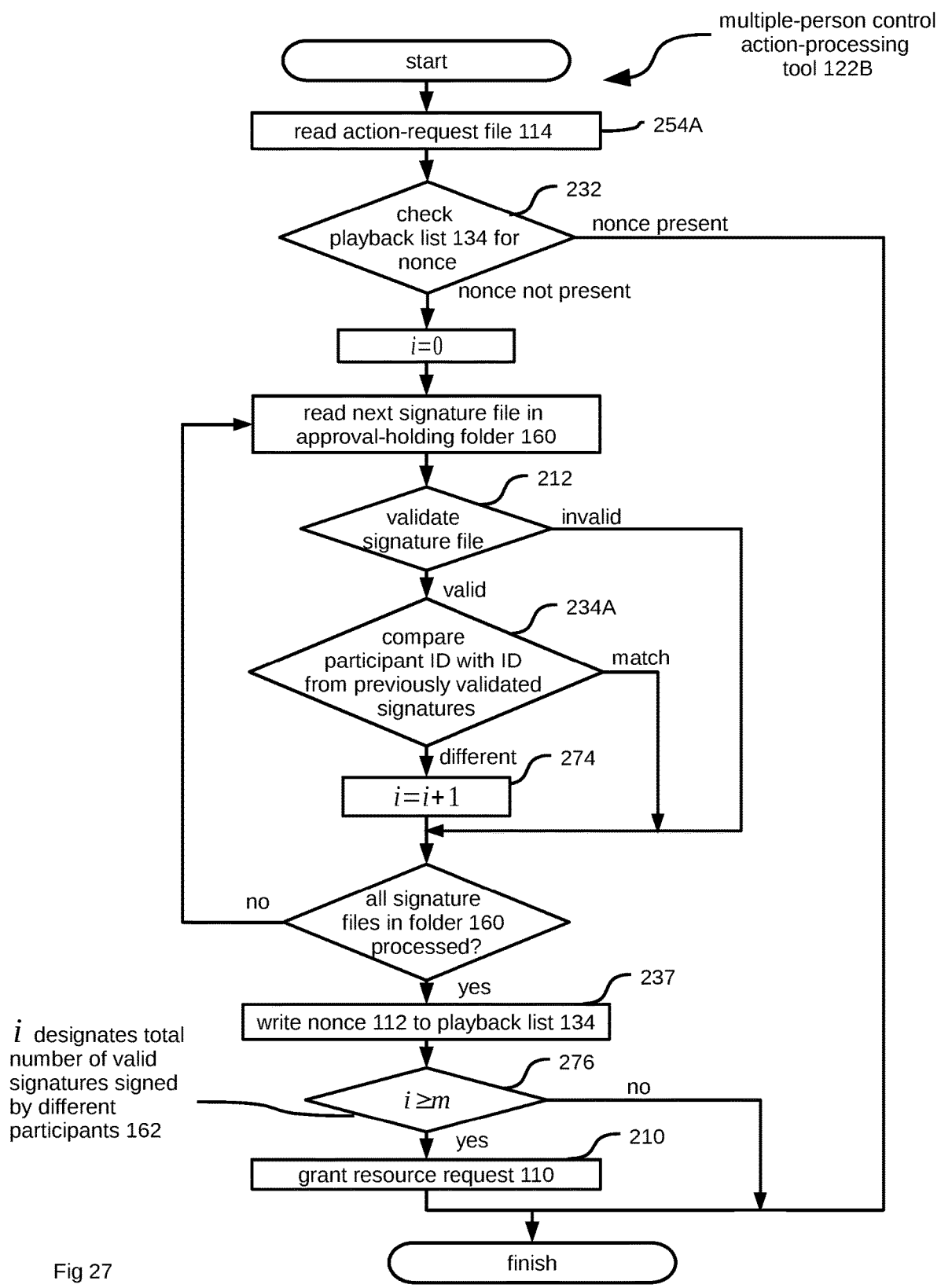

FIGS. 7A, 7B, and 7C show an overview of existing asymmetric-key signature functions FIGS. 8A, 8B, and 8C show an overview of existing symmetric-key signature functions FIG. 9 shows a block diagram for a conventional smart card FIG. 10 shows a flowchart for enrolling an applicant in a smart-card based system FIG. 11 shows an example certificate repository FIG. 12 shows a flowchart for signing using a conventional smart card FIG. 13 shows a flowchart for signature validation using a public-key infrastructure FIG. 14 shows an example authorized-participant table FIG. 15 shows a flowchart for enrolling an applicant in a password-based key system FIG. 16 shows a flowchart for digital signing using a password-based private key FIG. 17 shows a flowchart for validating a password-based signature FIG. 18 shows an authorized-participant table for a symmetric-key signature algorithm FIG. 19 shows an existing mobile device suitable for requesting and reviewing FIG. 20 shows a flowchart for enrolling an applicant in a mobile-device based system FIG. 21 shows a flowchart for signing using a mobile device FIG. 22 shows a flowchart for validating a symmetric-key signature FIG. 23 shows an approval package for multiple-person controls FIG. 24 shows a flow chart for creating a resource request for multiple-person controls FIG. 25 shows a flow chart for reviewing a request for multiple-person controls FIG. 26 shows a flow chart for processing a request to for multiple-person controls FIG. 27 shows an alternate flow chart for processing a request for multiple-person controls

DRAWINGS—REFERENCE NUMERALS 100 conventional secure-computing system
102 conventional secure-operating system
104 authorized participant
106 requester
108 reviewer
110 resource request
112 nonce
114 action-request file
116 request-signature file
118 action-request package
120 approval package
120A multiple-person control approval package
122 action-processing tool
122A action-processing tool for multiple-person controls
122B alternative action-processing tool for multiple-person controls
124 signature tag
126 approval-signature file
128 participant identifier
130 action-request tool
130A action-request tool for multiple-person controls
132 action-review tool
132A action-review tool for multiple-person controls
134 playback list
135 participant database
136 public key
137 verification key
138 private key
138A private key for symmetric-key signature algorithm
140 public-key infrastructure (PKI)
142 certificate authority (CA)
144 smart card (conventional)
146 certificate signing request (CSR)
148 digital certificate
150 certificate repository
152 authorized-participant table
152A authorized-participant table to support a symmetric-key signature algorithm
154 table authority
154A table authority for symmetric-key signature system
156 signing password
158 mobile device (conventional)
160 approval-holding folder
162 number of valid signatures with different participant identifiers
200 configure computer account privilege
202 sign
202A sign with ECDSA using a conventional smart card
202B sign with DSA using a password-based key
202C sign with HMAC from a mobile device
206 distribute action-request package
206A distribute link to approval-holding folder
208 review request
210 grant resource request
212 validate signature
212A validate signature under a public-key infrastructure
212B validate signature using a participant table 152
212C validate symmetric-key signature using participant table 152A
214 document resource request
216 create nonce
218 append nonce
220 sign with a requester's private key
222 display resource request
224 approve request
226 reject request
228 sign with reviewer's private key
230 transfer approval package to requester
230A transfer link to approval-holding folder
232 check whether nonce is present in playback list
234 compare the participant identifiers of the requester and the reviewer
234A compare the participant identifiers of the requester and m−1 reviewers
236 validate request signature
237 write nonce value to playback list
238 validate approval signature
238A validate m−1 approval signature files
240 run signing algorithm
240A run ECDSA signing algorithm
240B run DSA signing algorithm
240C run HMAC signing algorithm
242 read action-request package
244 prompt reviewer for approve/reject decision
246 run signature verification algorithm
246A run ECDSA signature verification algorithm
246B run DSA signature verification algorithm
246C run HMAC signature verification algorithm
248A enroll applicant in a PKI system
248B enroll applicant in a password-based system
248C enroll applicant in a mobile-device based system
250 generate key(s)
250A run ECDSA key-pair-generation algorithm
250B run DSA key generation using PBKDF2 based input algorithm
250C run HMAC key generation
252 prompt signer to enter smart card PIN
254 read approval package
254A read approval package from approval-holding folder
256 read participant identifier of signer
257 search for digital certificate of signer
258 validate CA signature for digital certificate
260 prompt signer to enter signing password
262 run PBKDF2

Figure 1:
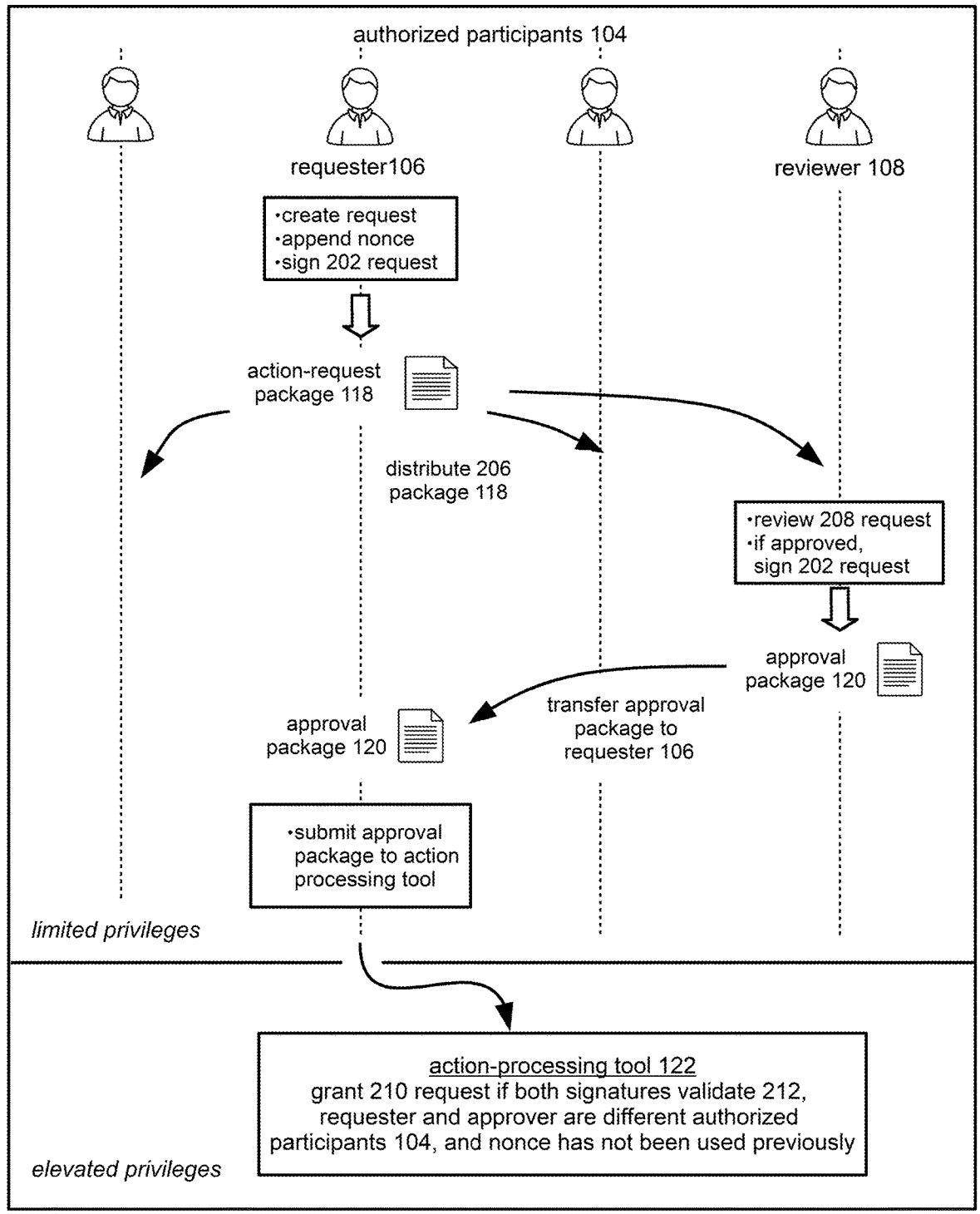
FIG. 1 shows an example usage of the present method of two-person controls
Figure 2:
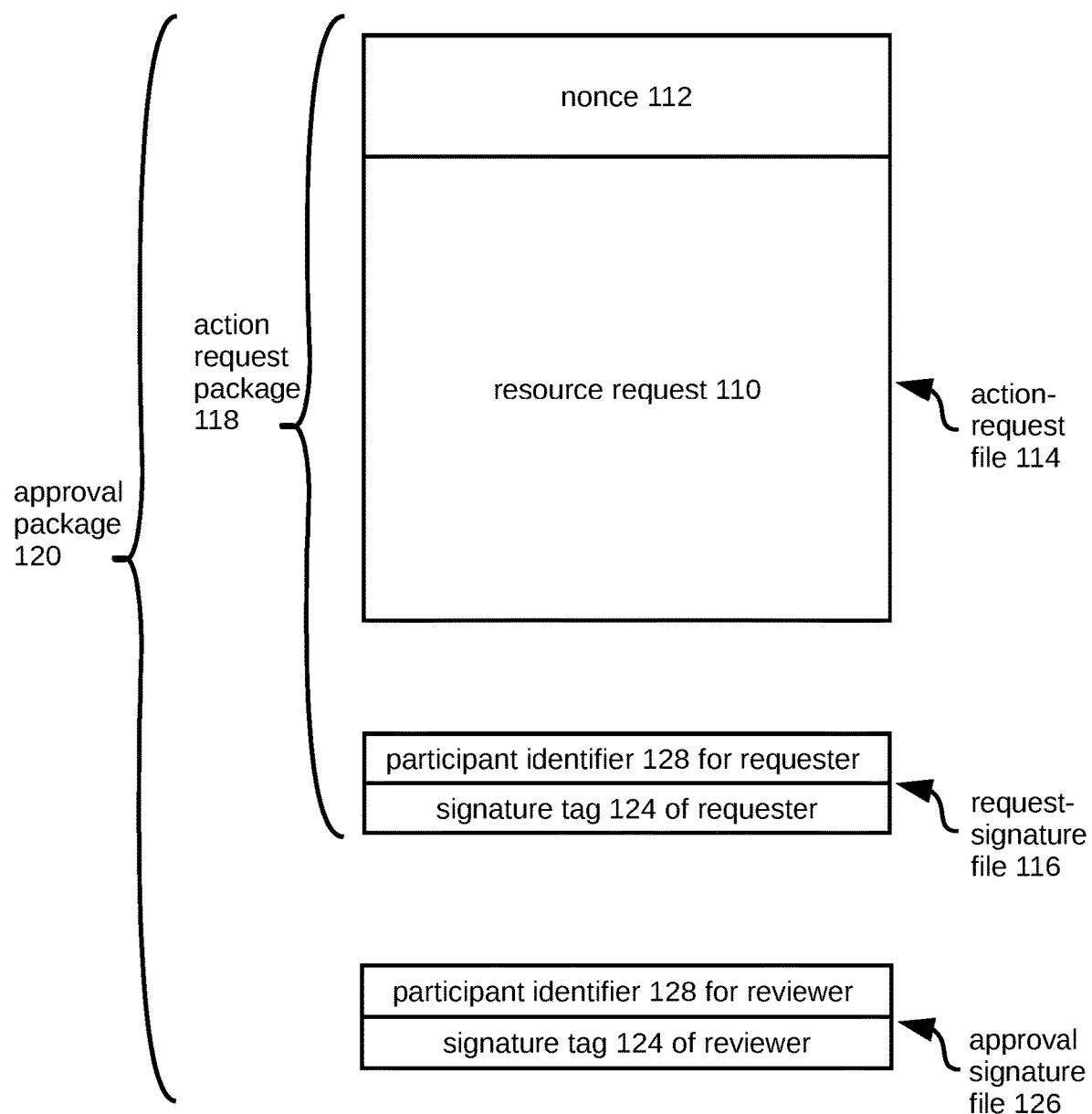
FIG. 2 shows the three components of an approval package
Figure 3:
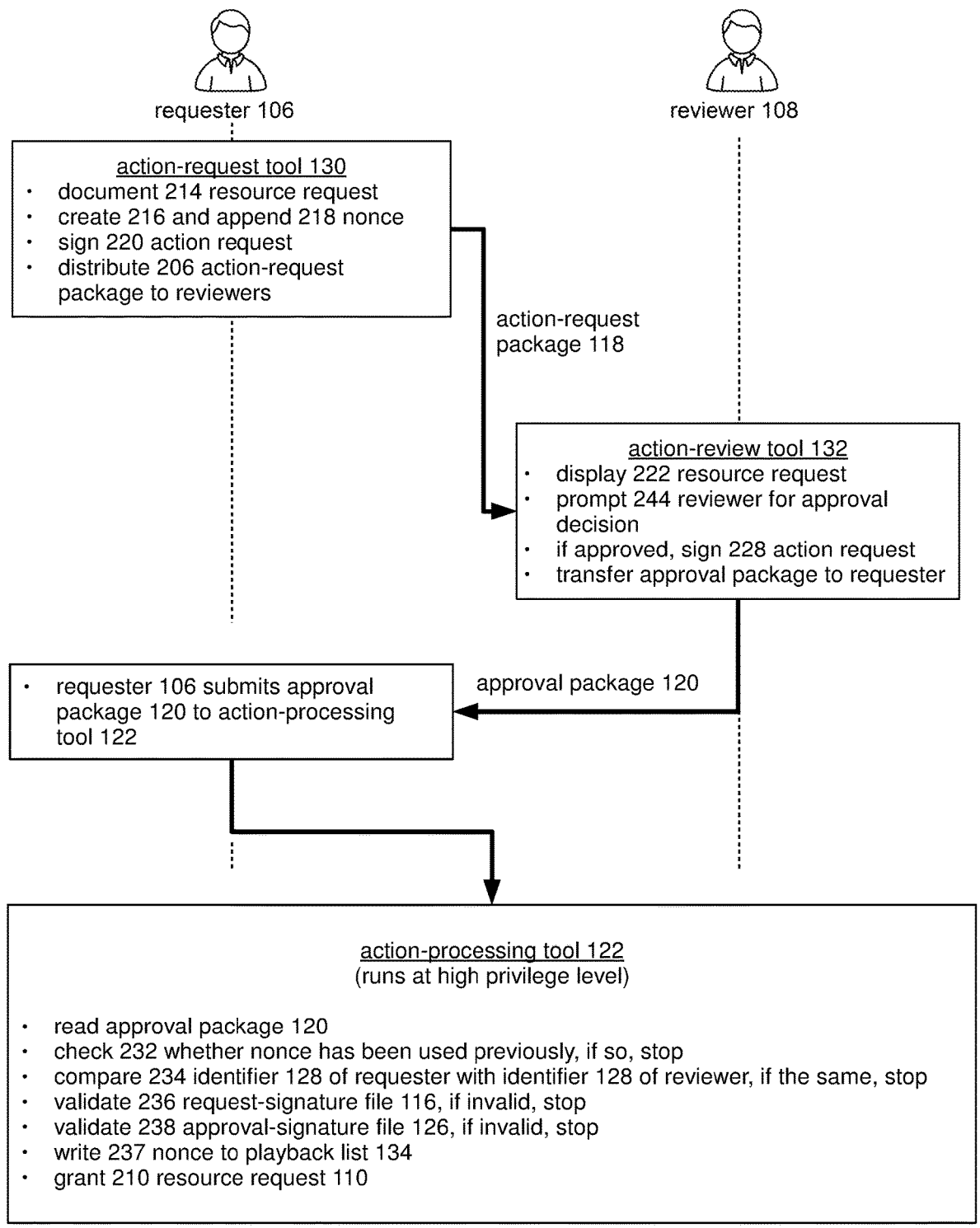
FIG. 3 shows an overview of the method

264 read participant table 152
264A read participant table 152A
266 look-up public key
268 read signature tag 124
270 look-up private key
272 notify requester m−1 approval signatures are present
274 count number of valid signature files with different signers
276 compare number of valid signature files with threshold Description Overview FIGS. 1-3

The present method of two-person controls is suitable for implementation on a conventional secure-computing system 100, which can be any system of electronic devices that stores and processes data and is designed to protect computer-accessible resources. The method is particularly useful for computing systems 100 that host sensitive data requiring protection from loss, modification or theft, such as servers, databases, or secure networks. Examples of sensitive data include banking transactions, personal medical records, payment information, personal financial data, sensitive emails, logon credentials, government classified data, proprietary information and so on.

Conventional secure-operating systems have long been capable of limiting user privilege to prevent unfettered access. However, locking-down user privilege is not an option for users who must perform system administrative functions since routine activities often require highest privilege. The present method overcomes this problem by providing a means to accomplish tasks requiring elevated privilege, but only after review and approval by a second person. The method can be used for any computer user role, however the present focus is system administration since this activity poses the greatest risk from the insider threat.

The method enables the secure-operating system to be operated with few or no users requiring highest privilege. Tasks that do require elevated privilege, such as those required for system administration, are executed under two-person control, which forces one system administrator to effectively check the work of another.

The method leverages a conventional secure-operating system 102. This can be any operating system that enforces user-access-control policies. Examples include UNIX, LINUX, and Microsoft Windows. These are mature, proven operating systems with well understood security properties. The user-access controls provided by secure-operating system 102 to selectively regulate who or which entities can access computer resources. In this context, accessing a computer resource has a broad meaning to include consuming, entering, releasing, copying, reading, erasing or using a computer resource.

For the present method, secure-operating system 102 is configured to prevent unfettered access by users, to include system administrators. The objective is to prevent individual users from violating security policy. For example, if the security objective is to protect patient-medical records, privileges for system-administrator-computer accounts are configured to prevent modification, destruction, or copying of patient records. By limiting privilege, a system administrator who has gone rogue cannot violate security policy. The present method performs tasks requiring privilege elevation, but only when approved by a second person.

FIG. 1 shows a sequence diagram for the present method of two-person controls. The example shows four computer users who have computer accounts with limited privilege, each of whom is an authorized participant 104 meaning they have been enrolled to participate in two-person controls as either a requester 106 or as a reviewer 108. Even though the users are system administrators, operating system 102 is configured 200 to limit privilege for their computer accounts.

The present method requires participation by at least two users including requester 106 and reviewer 108. A user who requests a task is performing the role of requester 106. A user who reviews such the request is performing the role of reviewer 108. Each authorized user can perform either role: requester 106 or reviewer 108. The example of FIG. 1 has the second user from the left participating as requester 106 and the user on the right participating as reviewer 108.

A resource request 110, can be any task or action initiated by a computer user, such as a system administrator, to cause secure-computing system 100 to perform an action. For example, resource request 110 may specify operations that access sensitive data, such as moving, copying, or erasing. Resource request 110 may specify changes to security policy of secure-computing system 100, such as changing user-account privilege levels or changing permission levels required for access to resources. In some secure-computing systems, resource request 110 may configure safety-critical infrastructure such as air traffic control or power plants. Other examples of resource requests 110 are operations that perform financial transactions or configure security settings for financial transactions. Resource requests 110 may also specify settings for secure networks such as configuring firewalls. These are a few examples of the many types of resource requests 110 that can be protected by the present method.

The method begins with requester 106 documenting resource request 110, and appending a nonce 112, to create an action-request file 114. Requester 106 digitally signs 202 action-request file 114 to create a request-signature file 116. Action-request file 114 together with signature file 116 comprise an action-request package 118, which is distributed 206 to other authorized participants 104.

Any authorized participant 104 receiving the request can participate as reviewer 108 by reviewing 208 the request, and if finding acceptable, digitally signing 202. FIG. 1 shows the rightmost user participating as reviewer 108, however any of the users other than the requester can participate as reviewer. Since reviewer 108 finds the request to be compliant with security policy and appropriate for the duties of the requester, reviewer 108 approves and digitally signs 202 the request. The approval signature together with action-request package 118 makes up an approval package 120. After approving, reviewer 108 transfers approval package 120 to requester 106.

Having received approval package 120, requester 106 submits approval package 120 to an action-processing tool 122 for processing and if compliant, tool 122 grants 210 resource request. Tool 122 is software that runs on secure-computing system 100, under control of secure-operating system 102 with a privilege level sufficient to grant resource request 110. To provide assurance the request has not been forged or modified, tool 122 validates 212 the request signature and the approval signature. Further, tool 122 checks that each signature is signed by a different user and checks to ensure the nonce value has not been used previously. If all criteria are satisfied, tool 122 grants 210 the request contained in the approval package.

The present method uses digital signatures to protect the non-repudiation and integrity of resource requests and approvals. A digital signature tag 124 is a string of bits that provides assurance that the claimed signatory signed action-request file 114 and provides assurance that neither nonce 112 nor the resource request 110 was modified after it was signed. A number of different digital signature algorithms are suitable for providing these assurances, including both asymmetric-key signature algorithms and symmetric-key signature algorithms which are also known as machine authentication codes (MACs).

The security provided by digital signatures relies on the confidentiality and integrity of each participant's crypto-keys. Similar to existing uses of digital signatures, key management for the present method should provide assurance of confidentiality for keys used to sign documents and provide assurance of integrity for keys used to validate signatures. There are many ways to manage keys for digital signature applications, some of which are illustrated in FIGS. 7-22. However, the present method is first described without a specific key-management implementation and without reference to a specific digital signature algorithm.

The contents of approval package 120, shown in FIG. 2, provide assurance the request has not been modified, it was requested by requester 106, it has been approved by reviewer 108, and the request has not been granted previously. Approval package 120 includes action-request package 118 and an approval-signature file 126. Action-request package 118 includes resource request 110, nonce 112, and request-signature file 116.

Resource request 110 is a list of one or more instructions that specify a task to be performed by secure-computing system 100. For example, request 110 may consist of command line code and operands that represent a task or multiple tasks to be executed. Nonce 112 is appended to request 110. Nonce 112 is a "number used once" that is inserted into the message to be signed. The purpose of nonce 112 is to track when resource requests are granted and to prevent re-execution should the request be accidentally or maliciously re-submitted or approved a second time. Together, nonce 112 and resource request 110 make up action-request file 114, which is the message to be signed.

Request-signature file 116 contains a participant identifier 128 for requester 106 and signature tag 124. Participant identifier 128 is a string that uniquely identifies each person who participates in two-person controls. The participant identifier listed in request-signature file 116 is the identifier of the signer, which in this case is requester 106. Each participant in two-person controls should have only one participant identifier 128. Some examples of strings that can serve as participant identifiers 128 are computer user-names, employee numbers, and participants' public keys.

Signature tag 124 is a string of bits generated by signing 202 action-request file 114 with a private key accessible only to requester 106. Signature tag 124 has the property that if action-request file 114 is modified, the signature will not validate. Signature tag 124 also has the property that if the entry for participant identifier 128 of the identity of the signer is modified, the signature will not validate.

Approval-signature file 126 contains participant identifier 128 for reviewer 108 and signature tag 124 of reviewer 108. Participant identifier 128 listed in approval-signature file 126 is the identifier of the signer, which in this case is reviewer 108. Signature tag 124 of signature file 126 is created by signing 202 action-request file 114 with a private key available only to reviewer 108.

The present method can be implemented with computer programs or scripts to assist in the creation of requests, computing digital signatures, validating signatures and granting requests. An overview of example scripts is shown in FIG. 3. The process flow begins at the top left with requester 106, who runs an action-request tool 130 to create an action-request package 118. Tool 130 prompts the requester to specify resource request 110. Tool 130 documents 214 the resource request by writing text that defines the request to action-request file 114.

Tool 130 creates 216 nonce 112 and appends 218 the nonce to resource request 110 to create action-request file 114. Tool 130 digitally signs 220 action-request file 114 to create signature tag 124. Signing 220 uses sign 202, but is performed by requester 106 using a key available only to requester 106. The data or message to be signed is action-request file 114, which includes the resource request and the nonce.

The last step performed by action-request tool 130 is to distribute 206 action-request-package 118 to other two-person-control participants for review. Any user designated for two-person control can review a request package. While there may be many users receiving and reviewing the request package, FIG. 3 introduces the method by showing a single user reviewing the request. That user, reviewer 108, initiates the review process by invoking an action-review tool 132.

Action-review tool 132 is a script that facilitates reviewing and approving action-requests. Tool 132 displays 222 the resource request to the reviewer and prompts the reviewer to either approve 224 or reject 226 the request. If reviewer 108 approves the request, review tool 132 signs 228 action-request file 114 to create signature tag 124. Signing 228 uses sign 202, but is performed using a key accessible only to reviewer 108. For simplicity, the flow chart of FIG. 3 does not show the case where the reviewer rejects the request. The flowchart of FIG. 5, to be discussed in a later section, addresses rejecting a request.

If the request is approved, tool 132 transfers 230 approval package 120 back to requester 106. To cause the request to be granted, the requester can submit package 120 to action-processing tool 122, which runs with sufficient privilege to execute system-administrative tasks. Before granting the resource request, tool 122 performs a series of security checks to ensure the request has been approved by two different users, the resource request has not been previously granted, and the resource request has not been modified. If any of the security checks fail, tool 122 does not grant the request. The steps, listed below, can be performed in any order.

The first step is to check 232 whether the nonce read from the action-request file is in a playback list 134. List 134 contains nonce values for all approval packages that have been previously submitted to tool 122 as well as nonces from action-request packages that have been reviewed and rejected. If the nonce of the action-request file is present in playback list 134, either the request has already been granted, or it has been rejected. In either case, tool 122 does not grant the resource request. If the nonce is not in the playback list, tool 122 proceeds to the second step.

The second step is to compare 234 the participant identifier 128 on request-signature file 116 with the participant identifier 128 on approval-signature file 126. If both participant identifiers 128 are the same, it indicates that a requester has approved his own request. In that case, tool 122 does not grant the resource request. If the participant identifiers 128 from file 116 and file 126 are different, tool 122 proceeds to the third step.

The third step is to validate 236 request signature 116. If the signature does not validate, tool 122 writes 237 the nonce to playback list 134 and terminates execution without granting the resource request. If the signature does validate, tool 122 proceeds to the fourth step.

The fourth step is to validate 238 approval signature 126. If the signature does not validate, it indicates signature 126 is a forgery or that request file 114 has been modified. In either case, tool 122 writes 237 the nonce to playback list 134 and terminates execution without granting the resource request. If the signature does validate, tool 122 writes the nonce to the playback list and grants the resource request.

Figure 4:
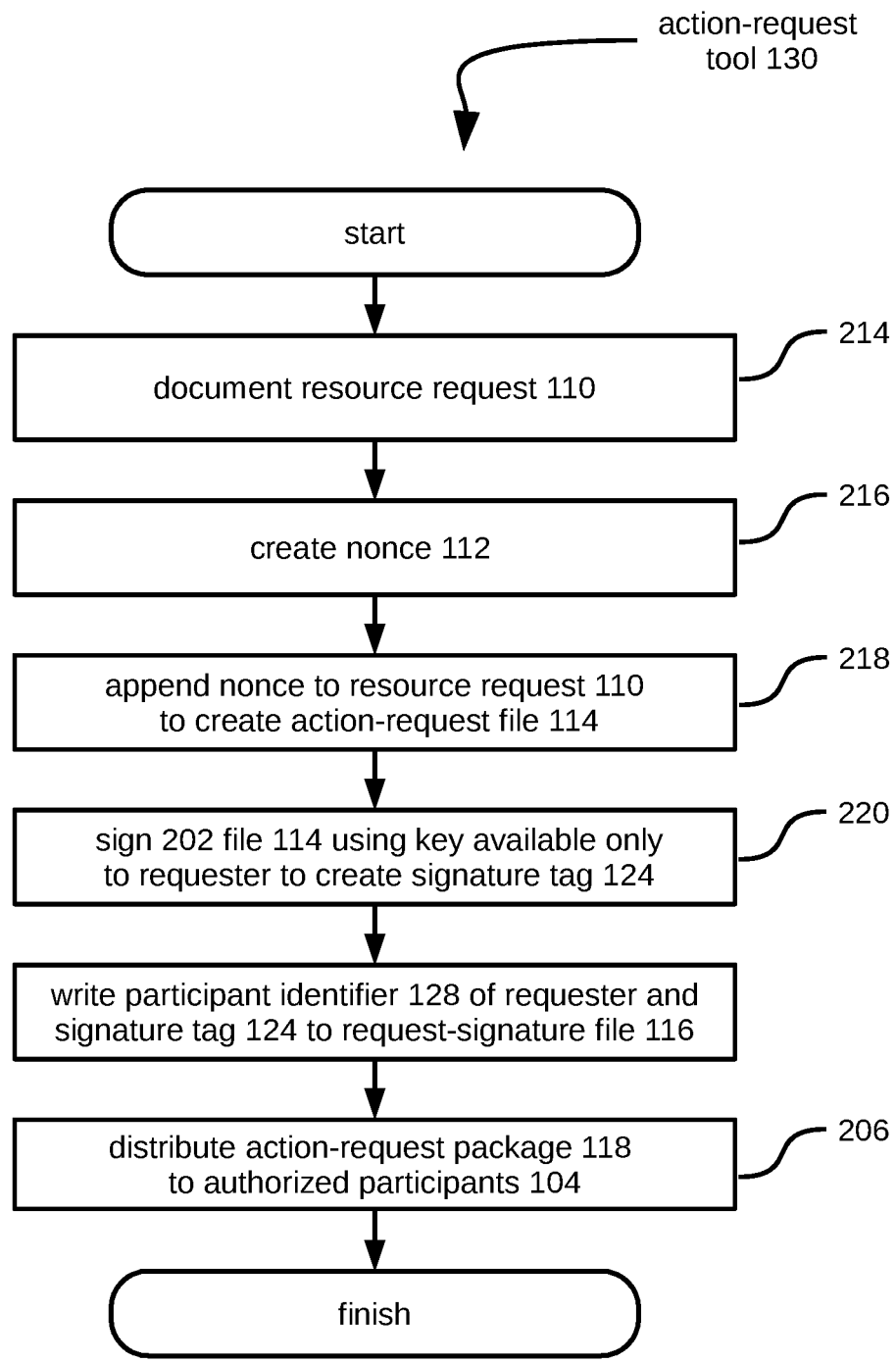
FIG. 4 shows a flowchart for creating a resource request
Figure 5:
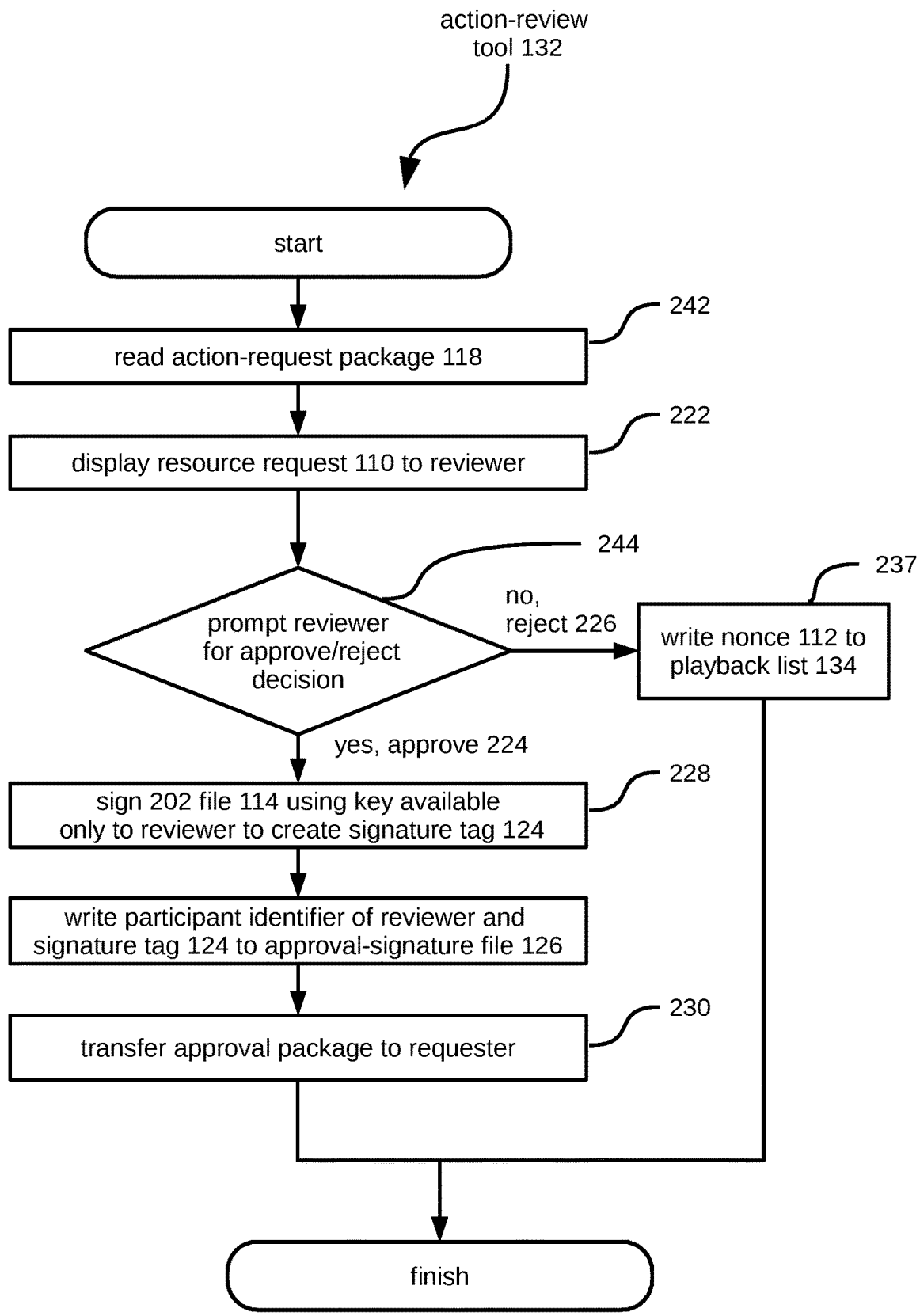
FIG. 5 shows a flowchart for approving a request
Figure 6:
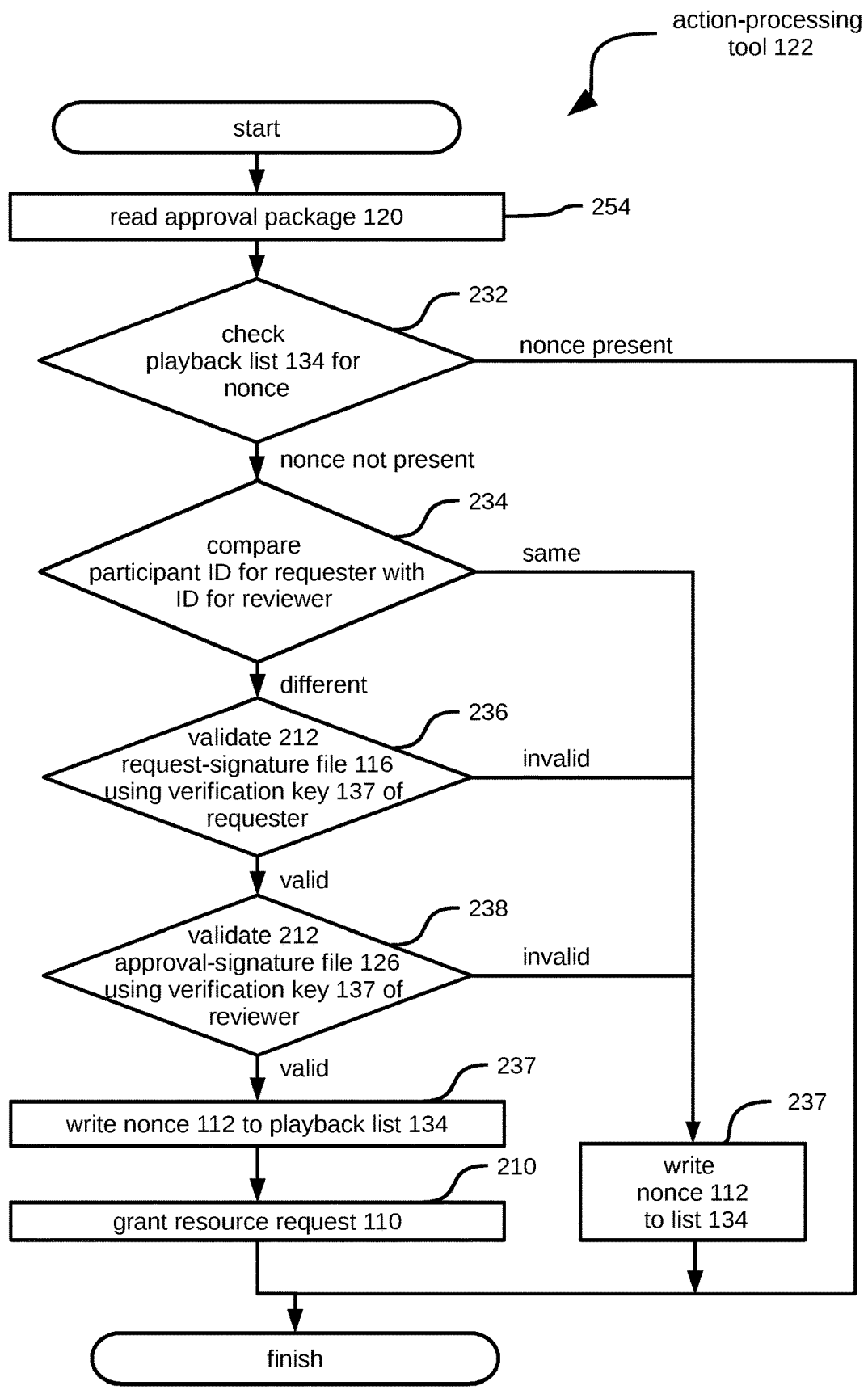
FIG. 6 shows a flowchart for granting a request

Detailed Tool Functionality—FIGS. 4-6

The present section describes in greater detail an implementation of the present method of two-person controls. The method requires participants to be able to digitally sign action requests using private keys available only to the signer. Moreover, action processing tool 122 must be able to verify digital signatures using a verification key 137 that is related to the private key. As such, authorized participants 104 must be enrolled, meaning each participant is provided with her own participant identifier 128, a private key for signing, and a corresponding verification key 137 that is stored in a participant database 135 accessed by tool 122 to validate digital signatures. Database 135 lists each authorized participant 104 along with the participant's verification key 137.

For the most part, key management needs for the present method is the same as for existing applications of digital signatures. Signing keys should be kept confidential and be accessible only by the owner. Verification keys should be protected from modification. The only additional key-management attribute needed for the present method is to control how many participant identifiers a given participant can use to sign documents since an authorized participant with more than one participant identifier would be able to approve his own action-request files. Specific aspects of key management schemes are provided in the description for FIGS. 7-22.

Once a sufficient number of participants are enrolled, any authorized participant 104 can use the method to grant resource requests requiring privilege elevation. The method can be divided into three phases:

1) requesting a resource, as implemented in action-request tool 130, 2) reviewing a resource request, as implemented in action-review tool 132, and 3) granting a resource request, as implemented in action-processing tool 122.

Digital signatures provide assurance that requests and approvals are authentic and that resource requests have not been maliciously modified. The first two phases utilize digital signature creation. The third phase, granting a resource, utilizes digital signature validation.

The first phase, requesting a resource, begins with requester 106, wishing to perform a task that requires privilege elevation, invoking action-request tool 130. Tool 130 is software that runs on secure-computing system 100, under control of secure-operating system 102. Alternatively, tool 130 may run on a personal security device capable of creating digital signatures. This is a separate processing device such as a smart phone, a mobile device, a hardware security module, a dongle, or a smart card. Further, as will be shown by subsequent examples, some steps of tool 130 may run on secure-computing system 100 while other steps may run on the personal security device.

A flowchart for action-request tool 130, shown in FIG. 4, shows the tool populating the fields of action-request file 114 starting with resource request 110, which is a list of one or more instructions to one or more actions to be performed by secure-computing system 100. Tool 130 prompts the requester to enter instructions that specify resource request 110. Request tool 130 documents 214 the resource request by writing code that specifies the request to a resource-request field of action-request file 114.

Tool 130 creates 216 a value for nonce 112, which is a "number used once." The purpose of nonce 112 is to prevent resource request 110 from being re-granted if it is accidentally or maliciously re-submitted or approved a second time. Many different approaches can be used to create 216 a value for nonce 112. The objective is to create a number that is unlikely to have been created previously. Some example approaches include using the output of a counter that increments each time tool 130 runs, taking a hash of the current system date and time, and taking the output of a pseudo-random number generator. It should be noted that if a nonce is repeated, it does not undermine security, but rather, it prevents the resource request from being granted since tool 122 treats the request as a playback attempt. Tool 130 creates a nonce value and appends 218 the nonce value to action-request file 114 by writing the value to the nonce field.

Tool 130 digitally signs 220 action-request file 114 to create request-signature file 116. This is accomplished by performing sign 202 using a key available only to requester 106. Tool 130 runs 240 the signing algorithm with action-request file 114 being the message to be signed to create signature tag 124. Some specific implementations of the signing process are shown in FIGS. 12, 16 and 21. Tool 130 writes participant identifier 128 for requester 106 and signature tag 124 to request-signature file 116. Action-request file 114 together with request-signature file 116 are collectively referred to as action-request package 118.

Tool 130 distributes 206 action-request package 118 to all available authorized participants 104. Since the integrity and non-repudiation of the request package is protected by request-signature file 116, the distribution method does not need to protect against malicious modification. As such, suitable methods to distribute 206 package 118 include email attachment, File Transfer Protocol (FTP), Secure File Transfer Protocol (SFTP) and by transfer to a shared directory. The present embodiment uses email attachment to distribute 206 action-request package 118, where the distribution list includes two-person-control participants. After distributing 206 action-request package 118, tool 130 terminates execution.

The second phase, reviewing a request 110, begins with a participant receiving request package 118 deciding to participate as reviewer 108 by invoking action-review tool 132 to review 208 the request package. Tool 132 is software that may run on secure-computing system 100 under control of secure-operating system 102. Alternatively, tool 132 may run on a personal security device capable of creating digital signatures. This is a separate processing device such as a smart phone, a mobile device, a hardware security module, a dongle or a smart card. Further, as will be shown by subsequent examples, some steps of tool 132 may run on secure-computing system 100 while other steps may run on the personal security device. This personal security device may be the same personal security device that is used to execute portions of action-request tool 130.

A flow chart for action-review tool 132 is shown in FIG. 5. Review tool 132 reads 242 the action-request package and displays 222 the resource request to the reviewer. After all commands have been displayed, the tool 132 prompts 244 the reviewer to either approve 224 or reject 226 the resource request.

Reviewer 108 assesses whether resource request 110 complies with security policies and is consistent with the requester's duties. If the reviewer assesses request 110 is appropriate and doesn't undermine security policy, the reviewer can choose to approve 224 the request. If the reviewer assesses that the request is unnecessary or that it creates a security vulnerability, the reviewer can choose to reject 226 the request.

If the reviewer rejects 226 the resource request, review tool 132 takes the nonce value read from request package 118 and writes 237 the nonce value to playback list 134. Playback list 134 is a file containing a list of nonce values from previously-submitted-request packages and action-request packages to be blocked from future execution, either because the request has already been granted, or because it was rejected by a reviewer. After write 237, tool 132 terminates execution.

If the reviewer approves 224 action-request package 118, tool 132 digitally signs 228 action-request file 114 to create approval-signature file 126. This process uses sign 202 with a a key available only to reviewer 108 by running 240 the signing algorithm with action-request file 114 being the message to be signed to create signature tag 124. Participant identifier 128 for reviewer 108 along with signature tag 124 of the reviewer 108 are written to approval-signature file 126.

Action-request file 114, request-signature file 116 and the approval-signature file 126 are collectively referred to as approval package 120. Tool 132 transfers 230 approval package 120 to the requester. Suitable methods to transfer 230 package 120 include email attachment, FTP, SFTP and by moving the files to a shared directory. The present embodiment uses email attachment to transfer 230 the action-request package to the requester. At this point the approval process is complete and review tool 132 terminates execution.

The third phase, granting a request, begins with requester 106 receiving approval package 120. At this point, the requester can submit package 120 to action-processing tool 122 for processing. If acceptable, tool 122 grants 210 resource request 110. Tool 122 is a script that runs on secure-computing system 100, under the control of secure-operating system 102, at a sufficient privilege level to grant allowed resource requests.

A flow chart for tool 122 is shown in FIG. 6. Tool 122 reads 254 each of the components of the approval package: action-request file 114, request-signature file 116, and approval-signature file 126. Before granting request 110, tool 122 performs a series of security checks to provide assurance the request has been approved by two different users, the request has not been previously granted, and the request has not been modified. The four criteria that provide these assurances are indicated by the diamond-shaped decision boxes.

The first decision box checks whether the request has been previously granted or whether the request has been previously denied. To this end, tool 122 reads playback list 134 and checks 232 whether nonce 112 of action-request file 114 is present in playback list 134. This is accomplished by comparing nonce 112 from file 114 with each value in playback list 134. If a match is found, tool 122 terminates without granting the resource request.

The second decision box checks whether requester 106 and reviewer 108 are different participants. To this end, tool 122 reads participant identifier 128 for the requester from request-signature file 116 and participant identifier 128 for the reviewer from approval-signature file 126. Tool 122 compares 234 these identifiers. If the identifiers are the same, it indicates a participant has approved his own request. In this case tool 122 writes 237 nonce 112 to playback list 134 and terminates without granting the resource request. If the participant identifiers are different, tool 122 proceeds to the third security check.

The third decision box checks whether request-signature file 116 is valid to establish the authenticity of the request. To this end, tool 122 validates 236 signature file 116 by running 246 the signature verification algorithm where the message to be verified is action-request file 114. Signature validation is performed using a verification key 137 known to belong to requester 106. Some example signature algorithms and key management systems are described in subsequent sections.

The fourth decision box checks whether approval-signature file 126 is valid to establish the authenticity of the approval. To this end, tool 122 validates 238 signature 126 by running 246 the signature verification algorithm. Again, the message to be verified is action-request file 114. However, this time, signature validation is performed using a verification key 137 known to belong to reviewer 108.

Passing all four security criteria indicates the requester is an authorized participant 104, and he has created the request. It also indicates the reviewer is not the same person as the requester, the reviewer has approved the request, and the reviewer is an authorized participant 104. Moreover the valid signatures indicate that the resource request has not been maliciously modified. Lastly, the unused nonce value indicates the request has not been previously granted. When all security criteria are met, tool 122 writes 237 nonce 112 to playback list 134 and grants the resource request. However, if any of the four security criteria are not met, tool 122 terminates without granting the resource request.

By disregarding the different roles being performed by the two authorized participants, whether it be requester or reviewer, the logic of action processing tool 122 can be stated in a simpler manner. By recognizing that validate 236 (the request signature) and validate 238 (the approval signature) both use the same generic validate 212 process, the last three decision boxes are logically equivalent to a simpler rule which is to count the number of valid signatures that were signed by different authorized participants and check whether two or more such signatures are present. Stated this way, the rule provide cryptographic evidence that two different authorized participants have indicated approval for the submitted resource request.

Compared to other systems, the present system offers greater convenience for system administrative functions and allows two-person controls to be added to existing secure computing systems with minimal change. The system combines the proven user-access controls of conventional secure-operating systems with the assurances of non-repudiation and authenticity provided by digital signatures to enforce two-person controls for resource requests requiring privilege elevation.

Detailed Implementation Examples FIGS. 7-22

Digital signature cryptography is a mature, widely used technology that provides assurance against forgeries and modifications of digital documents. Standard applications include authenticating internet transactions, authenticating software, authenticating websites and authenticating users of a network or database.

Existing applications of digital signatures typically use a key management system to publish keys used to verify signatures, provide assurance each key belongs to the intended user, and to provide assurance that the intended user has access to the corresponding signing key. Key management provides these assurances with secure processes to verify, enroll, and certify users of a security application. This section describes security objectives for key management as needed to support the present method of two-person controls.

The key management system uses participant database 135 with an entry for each authorized participant 104 containing participant identifier 128 and verification key 137. Database 135 can take many forms, ranging from digital certificate repositories to tables. In any case, key management should protect the database from modification by potential attackers to include authorized participants. Moreover, there should be a way to enroll an applicant as an authorized participant, meaning to add an entry to database 135, and to disenroll an authorized participant, meaning to remove an entry from database 135.

The National Institute of Standards and Technology (NIST) has assessed a variety of digital signature algorithms and provided recommendations. NIST categorizes digital signature algorithms into two types: asymmetric-key algorithms and symmetric-key algorithms. The present method of two-person controls can be implemented with either type. Current guidance for asymmetric-key algorithms, also called public key algorithms, is provided in FIPS PUB 186-4. Guidance for symmetric-key algorithms, also called MACs (Message Authentication Codes), is provided in FIPS PUB 198-1.

Asymmetric-key signature algorithms use a key pair consisting of a public key 136 and a corresponding private key 138. The private key is used to create a digital signature; verification uses the public key that corresponds to, but is not the same as, the private key. Each signatory possesses a private and public key pair. Public keys may be known by the public; private keys are kept secret. Anyone can verify the signature by employing the signatory's public key, but only the user that possesses the private key can sign. For asymmetric-key signature algorithms, public key 136 serves as verification key 137.

A distinction is made between signature verification, which runs the verification algorithm and signature validation which runs the verification algorithm but also includes a trusted method to obtain the correct verification key 137. A signature that validates is said to be a valid signature. A signature that does not validate is said to be invalid. There are a number of reasons why a signature may not validate. For example the verification key obtained for the participant identifier may not correspond to the signing key, the resource request may have been modified, the nonce may have been modified, or the message was signed by a private key that does not match the verification key obtained by the trusted method.

Overviews of data flow for generic asymmetric-key-signature functions are presented in FIGS. 7A, 7B, and 7C. Each figure corresponds to a different process used by the present method of two-person controls.

FIG. 7A shows the process to generate 250 a participant's private key 138 and public key 136. Usually key generation uses a random number generator. Depending on the particular digital signature algorithm, random numbers may be screened or processed in accordance with the signature algorithm. If the screening criteria are not met, a new random number is drawn, and the process continues until a suitable value is found. Depending on the algorithm, the random number may be used directly as a private key or it may be processed to create a private key. Once a private key 138 is created, it is processed with a one-way function to create public key 136. The one-way function attribute provides assurance that forger cannot derive private key 138 from public key 136.

FIG. 7B shows the data flow to digitally sign 202 which is a process to create a signature involving computations acting on the message to be signed. For the present method, the message to be signed is action-request file 114. Signature generation also uses private key 138 of the signer. Key 138 and action-request file 114 are inputs to the signing algorithm, which runs 240 on a processor. Typically the message to be signed is first hashed, or digested, to create a digest of the message, which is used as part of the signing process. The output of the signing algorithm is signature tag 124.

The signing algorithm is designed to provide assurance that signature tag 124 can only be created with access to private key 138, which is cryptographically bound to public key 136. Moreover, signature tag 124 provides assurance that any modifications to action-request file 114 will cause the signature to fail to validate. To prevent forgeries, key management should protect the confidentiality of each participant's private key 138. Software that accesses a user's private key to perform signing should also provide assurance that only the owner can create a signature. In many existing implementations, creating a digital signature requires the owner of the private key to perform some action to provide assurance that the signer is the owner of the private key. For example, in some existing systems, the signer must enter a password or PIN (Personal Identification Number) that is known only by the owner of the private key. Similarly, biometric data such as fingerprint parameters or iris scan data can be used to provide assurance access to the private key is given to the owner of the key.

Data flow to validate 212 a signature is shown in FIG. 7C. The inputs to the validation process are 1) participant identifier 128 of the participant who signed the document, 2) signature tag 124, and 3) action-request file 114. Validating 212 a signature uses a trusted process to obtain the signer's public key 136. Typically participant identifier 128 from the signature is used to look-up the public key of the signer from participant database 135. The inputs to the verification algorithm are public key 136, signature tag 124 and action-request file 114. A processor runs 246 the signature verification algorithm to determine whether the signature is valid. Typically a digest of the message is computed for use by the verification algorithm. The validation process relies on key management to protect the integrity of the each participant identifier 128 and the corresponding public key 136 contained in participant database 135.

Symmetric-key algorithms can also be used to implement the present method of two-person controls. Instead of a key pair, symmetric-key algorithms use a single private key 138A that is used for both generating digital signatures and for verifying digital signatures meaning private key 138A also serves as verification key 137. Symmetric-key algorithms are not suitable for many existing digital signature applications, due to the need to protect the confidentiality of key 138A which is needed for verification. However, as will be shown in a subsequent example, it is possible to protect private key 138A while implementing the present method of two-person controls.

Data flow for symmetric-key algorithm functions are shown the flow charts of FIGS. 8A, 8B, and 8C. The process to generate 250 key 138A is shown in FIG. 8A. Unlike for asymmetric-signature algorithms, the key management plan requires a copy of private key 138A to be accessible to be used for signature validation. However the confidentiality of private key 138A should be protected from other participants.

FIG. 8B shows the data flow to perform sign 202. To provide assurance that the owner has initiated the signing process, many key management plans require the signer to take some action to establish ownership of private key 138A. For example in some systems, the signer must enter a password or a PIN. In other systems, being logged on to the user's account may provide sufficient assurance that the user is the owner of the key. The inputs to the signing algorithm are the message to be signed, action-request file 114 and private key 138A of the signer. A processor runs 240 the signing algorithm on these inputs to create a signature tag 124.

FIG. 8C shows the process to validate 212 a symmetric-key signature. The key management plan should provide a way to access private key 138A of the signer, based on the listed participant identifier 128, in a manner that protects the confidentiality and integrity of key 138A. Digital signature tag 124, action-request 114, and private key 138A are inputs to the verification algorithm. A processor runs 246 the signature verification algorithm to determine signature validity. Like for asymmetric-key signature algorithms, the validation process should use the correct verification key. If an adversary can modify the verification key, she can create a forgery that will validate.

The term "verification key", referring to a key that can be used to verify a signature, is used for both asymmetric-key signature algorithms, in which case verification key 137 is public key 136, and for symmetric-key algorithms, in which case verification key 137 is the private key 138A. The term "private key," referring to a key that can be used to create signatures, is used for both asymmetric-key algorithms, in which case it is private key 138 and for symmetric-key algorithms, in which case it is the private key 138A.

Regardless of whether the method is implemented with symmetric-key or asymmetric-key signature algorithms, any rogue user can follow open standards to create his own private keys and use them to create signatures. To prevent such signatures from validating, key management should provide assurances that signature verification is performed with verification keys belonging to the authorized participant who created the signature. To achieve this assurance, keys used to verify signatures should be protected from modification. The reason being that a rogue user who can insert his own verification key will be able to create signatures that validate. As such, participant database 135, which relates each participant identifier 128 to the corresponding verification key 137 should be protected from modification.

Further, a participant's verification key should be bound to the participant's private key. For asymmetric key signature algorithms, bound means the verification key, or public key is computed from the private key, typically using a key pair generation algorithm. For symmetric key signature algorithms, bound means the private key is the same as the verification key.

Similarly, a rogue user should not have sufficient privilege to modify playback list 134 or action-processing tool 122 since such privileges could be used to defeat security checks and gain unfettered access to the system.

Key-management should also protect each user's private keys from access by other persons. A rogue user who can access the private key of another user would be able to forge signatures from that user.

For the present method of two-person controls, key management should provide an additional assurance that is not necessary for some traditional applications of digital-signature cryptography. Key management should provide assurance that at any given time, no participant is assigned multiple participant identifiers 128. A rogue user with multiple participant identifiers could gain unfettered access to the system by signing a request using one participant identifier and signing an approval using a different participant identifier.

The present method of two-person controls can be implemented using a variety of processing devices, digital-signature algorithms and key management systems. To illustrate some of these options, three example embodiments are presented. The first embodiment uses smart cards and a Public-Key Infrastructure (PKI.) The second embodiment is implemented entirely in software running on a conventional secure-computing system 100 without use of additional processing devices. The third embodiment uses personal mobile-devices to create action-request packages 118 and to review resource requests 110 and if approved, create approval signature files 126. After approval, the reviewer's personal mobile device transfers approval package 120 to action-processing tool 122 running on secure-computing system 100 for processing and if security criteria are met, grants resource request 110. The third embodiment also illustrates the method can use a symmetric-key-signature algorithm such as the Keyed-Hash Message Authentication Code (HMAC.)

Embodiment Using a Public-Key Infrastructure—FIGS. 7-13

PKIs are used in many computing systems to support existing public-key cryptography applications such as user authentication and email authentication. Such PKIs are easily adaptable to support the present method of two-person controls. A PKI 140 is a system for publishing the public keys used in public-key cryptography that supports validating signatures, enrolling, and certifying users of a security application. The present embodiment is preferred for computer systems that already use a PKI as well as for applications where high levels of security are desired.

A variety of commercial PKIs are available, many of which are suitable for implementing the present method of two-person controls. PKI 140 of the present example is managed by a certificate authority (CA) 142. This is a person responsible for providing assurance that two-person control participants are properly tied to their participant identifiers 128, that each participant is associated with the correct public key 136, and that each participant has been assigned only one participant identifier 128.

Like many existing PKI systems, the present embodiment provides each participant with a conventional smart card 144 to enhance security. Card 144, shown in FIG. 9, contains a microprocessor, volatile memory, a random number generator, protected non-volatile memory for key storage, non-volatile memory to store software, and an interface to communicate with secure-computing system 100 via a card reader. Non-volatile memory is loaded with software that implements ECDSA key-pair generation and digital signing. Currently such products are available commercially.

A flow chart showing the steps to enroll 248A participants in two-person controls in a PKI-based embodiment is shown in FIG. 10. The first step is for CA 142 to provide each approved applicant with her own smart card 144. To provide assurance smart cards are assigned to the correct authorized participants, CA 142 distributes cards 144 to each participant in person, making sure that each participant is issued only one smart card 144. CA 142 instructs each participant to plug smart card 144 into a card reader connected to secure-computing system 100.

Smart card 144 is programmed to support enrollment processing. As such card 144 is programmed to request and receive the applicant's private user PIN and then run 250A the ECDSA key-pair-generation algorithm to create the applicant's private key 138 and corresponding public key 136. Card 144 writes private key 138 to protected-non-volatile smart-card memory. Card 144 writes public key 136 and the participant's identifier 128 to a certificate signing request (CSR) 146. In standard PKI terminology, identifier 128 is often referred to as a "distinguished name" since it uniquely identifies the participant. To protect against malicious modification, smart card 144 signs certificate-signing request 146 using private key 138. Before signing, card 144 requires the owner to enter a PIN before proceeding. The signed CSR 146 is provided to CA 142.

CA 142 reviews newly submitted CSRs 146 and verifies that security objectives are met. First, CA 142 verifies that CSR 146 was submitted by the person with the participant identifier 128 listed on CSR 146. Second, CA 142 verifies the applicant has the private key that matches the public key contained in CSR 146. This is accomplished by verifying the signature for the CSR. These first two verification steps are standard CA responsibilities, common to most PKI systems. To support two-person controls, an additional check is recommended. CA 142 should also verify that no participant has more than one participant identifier 128 and no participant has more than one smart card. If CA 142 is satisfied that all criteria have been met, CA 142 creates a digital certificate 148 for the applicant.

Digital certificate 148 is a document that binds the participant to the participant's public key 136. In many existing PKIs, digital certificates contain additional information such as certificate expiration dates and authorization levels. To protect against forged digital certificates and unauthorized modification, certificates are signed by CA 142 and used only after the signature has been verified.

The CA created signature of digital certificate 148 provides assurance CA 142 has authorized participation in two-person controls and it protects the participant's public key 136 from modification. A participant with a valid digital certificate is said to be "enrolled" in the PKI. A certificate repository 150 is used to store signed digital certificates 148, in effect serving as a participant database 135. FIG. 11 shows the contents of an example certificate repository. Each digital certificate 148 in repository 150 contains the owner's participant identifier 128 and the owner's public key 136, shown in hexadecimal form. Certificate repository 150 effectively serves as participant database 135 listing participant identifier 128 and the associated public key 136 for each authorized participant 104. CA 142 is also responsible for disenrolling participants to prevent future participation. This is done by removing the participant's digital certificate 148 from repository 150. The system should prevent a participant who has been disenrolled from regaining authorized participant status by re-installing digital certificate 148 in repository 150.

The key lengths shown in FIG. 11 are notional and depend on the particular signature algorithm and the selected key lengths. The digital signature algorithm for the current embodiment is ECDSA-384 which uses a 384-bit public key expressed as 96 hexadecimal digits.

After enrollment in PKI 140, a participant can participate as either requester 106 or reviewer 108. Both roles require participants to be able to sign 202 action-request file 114 to create a valid signature tag 124. In the present embodiment, signing 202A with the ECDSA algorithm is performed on a processor resident on smart card 144 both to sign 220 by requester 106 and to sign 228 by reviewer 108. Action-request tool 130 invokes the requester's smart card 144 for signing 220 by requester 106 and action-review tool 132 invokes the reviewer's smart card 144 to perform signing 228 by reviewer 108.

A flowchart for signing 202A using a smart card is shown in FIG. 12. The first step is to read the file to be signed, which for the present method is action request 114. The participant performing signing 202A is prompted 252 to enter his smart card PIN. After receiving the correct PIN, smart card 144 retrieves the participant's private key 138 and uses it along with file 114 to run 240A the ECDSA signature generation algorithm to create signature tag 124. The resulting signature file, either request-signature file 116 or approval-signature file 126, is created by writing signature tag 124 and the signer's participant identifier 128 to the signature file.

Action-processing tool 122 performs validate 212A two times to detect unauthorized, modified or forged approval packages. The first time is to perform validate 236 which processes request-signature file 116. The second is time is to perform validate 238 which processes approval-signature file 126. The steps of validate 212A are described by the flow chart of FIG. 13. These steps are performed by action-processing tool 122, which runs on secure-computing system 100.

Validating 236 the request signature begins with tool 122 reading 254 approval package 120 which contains request-signature file 116. Tool 122 reads 256 participant identifier 128 of signer, which for the present signature is requester 106 and searches 257 digital-certificate repository 150 for a digital certificate with the reviewer's participant identifier. If repository 150 contains no digital certificates with a matching participant identifier, tool 122 declares signature 116 to be invalid and terminates without granting the resource request.

If a digital certificate 148 is found with the requester's participant identifier, tool 122 validates 258 the CA's signature for the digital certificate. If the CA's signature fails to verify, tool 122 declares signature 116 to be invalid and terminates without granting the resource request. If the signature for the digital certificate is valid, tool 122 reads public key 136 for the reviewer from certificate 148 and reads action request file 114 from approval package 120. Tool 122 then runs 246A the ECDSA signature-verification algorithm using the public key read from the requester's digital certificate, signature tag 124 read from request-signature file 116, and action-request file 114 being the message to be verified. The validation result is used as described in the flow chart for action-processing tool 122, shown in FIG. 6.

Validating 238 the approval signature begins with tool 122 reading 254 approval package 120 which contains approval-signature file 126. Tool 122 reads 256 participant identifier 128 of reviewer 108 and searches digital-certificate repository 150 for a digital certificate with the reviewer's participant identifier. If repository 150 has no digital certificates with a matching participant identifier, tool 122 declares signature 126 to be invalid and terminates without granting the resource request.

If a digital certificate 148 is found with the reviewer's participant identifier, tool 122 validates 258 the CA's signature for the digital certificate. If the CA's signature fails to validate, tool 122 declares signature 126 to be invalid and terminates without granting the resource request. If the signature for the digital certificate is valid, tool 122 reads public key 136 for the reviewer from certificate 148 and reads action-request file 114 from approval package 120. Then tool 122 runs 246A the ECDSA signature-verification algorithm using the public key read from the reviewer's digital certificate, signature tag 124 read from approval-signature file 126, and action-request file 114 being the message to be verified. The validation result is used as described in the flow chart for action-processing tool 122, shown in FIG. 6.

An advantage of the present PKI-based embodiment is that private key 138 is never exposed to secure-computing system 100. Moreover, controls on participant enrollment and modification protections of public keys do not rely on the user-access control features of secure-operating system 102. Rather it relies on digital signatures to provide assurance that each participant's digital certificate 148 is authorized and has not been modified. As such, the present embodiment of two person controls is enforced with a layer of protection separate from the secure-operating system.

While the present method reduces reliance on secure-operating system 102 to enforce security objectives, some access-control features of the secure-operating system are used to prevent a system administrator who has gone rogue from unilaterally causing the system to execute tasks requiring a higher privilege level. To this end, secure-operating system 102 should be configured 200 to limit privilege of users to modify playback list 134 or action-processing tool 122 since such privileges could be used to undermine two-person controls.

While the present embodiment uses a PKI with a smart card assigned to each authorized participant, smart cards can also be used with other types of participant databases. Similarly, other types of processing devices such as mobile phones, dongles, hardware security devices, personal computers or secure computer systems can be used with a PKI to serve as the participant database.

As can seen, the present embodiment enforces two-person controls to execute requests requiring elevated privilege. The embodiment protects access to each participant's private key and provides protection against modification of user's public keys. Moreover, the CA verifies that no user has more than one participant identifier enrolled in two-person controls.

Embodiment Using a Table of Two-Person Control Participants—FIGS. 14-17

The present embodiment can be implemented without a traditional PKI and without additional hardware devices such as smart cards, mobile devices, dongles or hardware security devices. In fact, the present method of two-person controls can be implemented entirely in software running on secure-computing system 100 under control of secure-operating system 102. While addressing the same security objectives, the present embodiment has several significant differences. Instead of protecting private keys with a smart card, the present embodiment protects confidentiality of private keys 138 using a password-based key derivation function. Moreover, the present embodiment uses user-access control features of secure-operating system 102 to protect the integrity of public keys 136 rather than protecting with the signature of the CA.

Instead of a PKI to bind each participant's identifier 128 to the correct public key, the present embodiment uses a two-person-control-participant table 152 to serve as participant database 135. This is a table that lists all users authorized to participate in two-person controls. For each authorized participant, table 152 has an entry that lists the participant's identifier 128 and the participant's corresponding public key 136.

An example two-person-control-participant table 152 is shown in FIG. 14. Each participant has a row containing participant-unique data. The first column is populated with participant identifier 128. The second column contains public key 136, shown in hexadecimal form.

While the present method can be implemented with a variety of digital signature algorithms, the present embodiment uses the Digital Signature Algorithm (DSA) as described in Federal Information Processing Standards Publication 186-4. DSA is an asymmetric-key signature algorithm that supports a number of key sizes. The current embodiment uses DSA-3072 which has a 3072-bit public key expressed as 768 hexadecimal digits.

The participant-enrollment process is managed by a table authority 154. This is a person designated to perform initial setup of the table 152. Table authority 154 is provided with a computer account with sufficient privilege to modify table 152. Computer accounts of other users should have insufficient privilege to modify table 152. For example, in UNIX, permissions for table 152 can be set such that root privileges are required for write access to table 152 and table authority 154 is provided with a computer account with root privileges.

Table authority 154 should be trusted since the privilege to write to table 152 is sufficient to gain unfettered access to the computer system. For this reason, computer account privileges for table authority 154 should be reduced once table 152 has been set up with two or more participants. Once two participants have entries in table 152, the present method method of two person controls can be used to reduce privilege for table authority 154. Further, access to participant table 152 to support enrollment and dis-enrollment activities can be performed using the present method of two-person controls. Once the present method is implemented, the secure-computing system 100 can be operated without any users having highest privilege.

The security of the digital signature relies on protecting access to each participant's private key. A number of techniques are available to protect private keys. The present embodiment uses a password-based key derivation function such as PBKDF2 to protect private-key confidentiality and prevent access by other users. PBKDF2, described in NIST Special Publication 800-132 operates on a user's signing password 156 to generate private key 138. Signing password 156 is a string of characters that is remembered by the participant, and is difficult for others to guess. In order to ensure confidentiality of each participants' private key 138, the confidentiality of each user's signing password 156 should be protected.

FIG. 15 shows a flow chart outlining the steps to enroll 248B applicants who have been approved to participate in two-person controls in a password-based system. The first step is to provide each applicant with access to enrollment software that runs on secure computing system 100.

Enrollment software creates the applicant's key pair. The DSA reference specifies the generation of a random number to serve as the private key. In the present embodiment, the random number is replaced with output from the PBKDF2 algorithm. As such, enrollment software prompts the applicant to enter her personal password 156 and runs 262 the PBKDF2 algorithm, operating on password 156 to create the applicant's private key 138. Enrollment software then runs the DSA key-pair-generation algorithm to generate 250B the applicant's public key 136. Enrollment software transfers public key 136 to table authority 154. Once table authority 154 is assured that key 136 belongs to the applicant and the applicant does not have an additional entry in table 152, authority 154 uses her privilege to add an entry to table 152 for the applicant, that includes the applicant's participant identifier 128 and the applicant's public key 136.

After the method is operational, user privileges for table authority 154 can be reduced to prevent table authority 154 from adding a second entry in table 152 by which she can approve her own requests to gain unfettered access to the system. Instead of allowing a single user to have write access to table 152, the present method of two-person controls can be used to add participant entries to table 152. This is initiated by an authorized participant creating an action-request file specifying adding an entry to table 152, getting a second participant to approve the request, and submitting the resulting approval package to action-processing tool 122. Similarly, the present method of two-person controls can be used to disenroll a participant, meaning removing the participant's entry in table 152 to prevent future participation.

Once an applicant has an entry in table 152, she can participate as either requester 106 or reviewer 108. Both roles require the participant to be able to sign 202B action-request file 114 to create a valid signature tag 124. The same signing 202B process is used by action-request tool 130 for digitally signing 220 by requester 106 and by action-review tool 132 for digitally signing 228 by reviewer 108. For the present embodiment, the steps of the signing process, shown in FIG. 16, are incorporated into action-request tool 130 and into action-review tool 132.

The first step of signing 202B is for the tool (either action-request tool 130 or action-review tool 132) to read the file to be signed, which is action-request file 114. The tool then prompts 260 the signer to enter signing password 156 and runs 262 the PBKDF2 algorithm on signing password 156 to create the signer's private key 138. The DSA signature generation algorithm is run 240B using the signer's private key 138 on action-request file 114, to create signature tag 124. The resulting signature file, either request-signature file 116 or approval-signature file 126, is created by writing signature tag 124 and the signer's participant identifier 128 to the signature file.

As part of the granting phase, action-processing tool 122 performs the validate 212B process to validate 236 request-signature file 116, and a second time to validate 238 approval-signature file 126. A flow chart for validation 212B is shown in FIG. 17.

To validate 236 request-signature file 116, tool 122 begins by reading 254 approval package 120 and reading 264 table 152. Tool 122 reads 256 the participant identifier of requester 106 from request-signature file 116, which is part of package 120. The participant identifier of the requester is used to look-up 266 the signer's public key 136 from table 152. validate 212B is performed using the signer's public key 136 to run 246B the DSA signature-verification algorithm to determine whether the signature 116 of action request file 114 is valid.

The second validation performed by tool 122 is validate 238 approval-signature file 126. As part of reading 254 approval package 120, tool 122 reads 268 signature tag 124, which includes reading 256 the participant identifier of reviewer 108. The participant identifier of reviewer 108 is used to look-up 266 the reviewer's public key 136 from table 152. Tool 122 runs 246B the DSA signature verification algorithm using public key 136 of the reviewer to determine whether the signature 126 of action request file 114 is valid. Tool 122 also performs compare 234 of the participant identifier for requester with participant identifier for reviewer, and check 232 for presence of nonce in playback list 134. If both signatures are valid, compare 234 shows different participant identifiers, and check 232 shows no appearance of nonce in playback list 134, tool 122 grants resource request 110.

As such, the present embodiment leverages user-access controls of secure-operating system 102 to prevent unauthorized modifications to table 152, action-processing tool 122, and playback list 134. Furthermore, the present embodiment protects each participant's private key 138 from being used by other participants since private keys are not stored on any part of the processing system. Instead private keys are generated on the fly using signing password 156 known only to the user.

Implementation Using Existing Personal Mobile Devices—FIGS. 18-22

The present embodiment illustrates that resource requests and approvals can be performed remotely using personal mobile devices. The present embodiment also demonstrates that symmetric-key signature algorithms can be used to provide assurance that requests and approvals have not been forged or modified. However, it should be understood that symmetric-key signature algorithms can be used with other types of processing devices such as smart cards, hardware-security modules, dongles, and personal computers. Similarly, mobile devices can be used with asymmetric-key signature algorithms as well as with symmetric-key signature algorithms.

Like an asymmetric-key signature algorithm, a symmetric-key signature algorithm processes a key with a message to provide assurance of authenticity. However, unlike the asymmetric signature algorithms, symmetric-key algorithms use the same key for both signing and verifying signatures. A number of symmetric-key signature algorithms have been developed. The present embodiment uses the Hashed Key Authentication Code (HMAC), as described in FIPS 198-1, July 2008.

The present embodiment uses a two-person control participant table 152A to bind each participant identifier 128 with the participant's verification key, to serve as participant database 135. However, since the verification key is also the private signing key, the confidentiality of table 152A should be protected from participants. As such, user access controls of secure-operating system 102 should be configured to ensure participants of two-person controls do not have read or write access to table 152A.

An example two-person control participant table 152A is shown in FIG. 18. Each participant has a row containing participant-unique data. The first column is populated with participant identifier 128. The second column contains private key 138A, shown in hexadecimal form.

Each participant in two-person controls is provided with a conventional mobile device 158, such as a smart phone. Device 158 is used to create action-request files 114 and approval packages 120. As before, action-processing tool 122 runs on secure-computing system 100, under the control of secure-operating system 102. Some typical features of mobile device 158 are shown in FIG. 19.

Mobile device 158 has a wireless transceiver to send and receive data from secure-computing system 100. Typically, such links are accomplished through a combination of wireless networks setup by phone companies that connect to the internet and secure-computing system 100 has access to the internet. Device 158 has a user interface, such as a key pad and display, or a touch screen by which participants can enter and view resource requests. The user interface is also used to enter approval and rejection decisions. Device 158 also has a non-volatile memory which is used to store the key 138A. To protect against unauthorized users accessing key 138A, device 158 employs user authentication protect against unauthorized access to device 158. Examples of user authentication are passwords, iris scanners and fingerprint checkers.

The steps to enroll 248C an applicant in a mobile-device based system are shown in the flow chart of FIG. 20. Enrollment for the current embodiment is managed by a table authority 154A who provides each authorized applicant with enrollment software that runs on the applicant's personal mobile device. Table authority 154A is also responsible for disenrolling participants to prevent future participation. This is done by removing the participant's entry in table 152A.

Enrollment software running on applicant's personal-mobile device 158 generates 250C private key 138A using a true-random number generator. While less secure, generate 250C can be also performed using a psuedo-random number generator with inputs such as metadata or fine-scale time stamps. Enrollment software stores one copy of key 138A is on nonvolatile memory in device 158. Software transfers a second copy of key 138A to table authority 154A.

A person-to-person delivery of applicant's key 138A provides assurance to table authority 154A that the intended applicant has the key. This can be accomplished by connecting device 158 to secure-computing system 100 using a data transfer cable such as a USB cable to transfer key 138A to secure-computing system 100. Alternatively, the transfer can be accomplished via a virtual private network that includes device 158 and computer system 100. Alternatively the transfer can be accomplished by secure email.

After receiving key 138A, table authority 154A verifies key 138A belongs to the applicant. One technique to establish ownership is for table authority 154A to send a test document and ask the applicant to sign the document. If applicant returns a signature and the signature verifies with key 138A, it provides assurance the applicant owns key 138A. Once table authority is confident key 138A belongs to the applicant, table authority 154A creates an entry in table 152A that includes the applicant's participant identifier 128 and the applicant's key 138A.

A participant making a resource request that requires privilege elevation initiates the process by running action-request tool 130 on the requester's personal mobile device 158. The steps of action-request tool 130 are shown in FIG. 4. Requester 106 uses the device's display and user interface to document 214 resource request 110. Device 158 creates 216 nonce 112 using the device's random number generator. Device 158 appends 218 nonce 112 to resource request 110 to create action-request file 114.

The device's user-authentication system provides assurance that only requester 106 has access to device 158 and that signing 220 is performed using a key available only to requester 106. Signing 202 is implemented by device 158 as sign 202C with HMAC following the steps of FIG. 21. Device 158 reads action-request file 114 from volatile memory. Device 158 accesses key 138A from nonvolatile memory and runs 240C the HMAC signing algorithm to create signature tag 124. Device 158 writes signature tag 124 and participant identifier 128 of requester 106 to request-signature file 116. Signature file 116 and action request 114 together make up action-request package 118. Device 158 distributes 206 request package 118 to personal mobile devices 158 owned by other two-person control participants. Distribution is performed over a network or over combinations of networks that can include optical fiber, wired and wireless data links.

A participant who receives package 118 on her personal device 158 can use the device to review the request and if approving, sign the request in accordance with the steps of action-review tool 132, shown in FIG. 5, which in the current embodiment are performed on device 158.

Device 158 begins the review process by reading 242 action request 118 and displaying 222 resource request 110 to reviewer 108. Device 158 prompts 244 reviewer 108 to either approve 224 or reject 226 resource request 110, and indicates to reviewer 108 how to enter the decision on the device's user interface.

If reviewer 108 rejects 226 resource request 110, device 158 transmits nonce 112, to secure-computing system 100 to software that writes nonce to playback list 134. If reviewer 108 approves 224 request 110, device 158 signs 228 action-request file 114 using a key only accessible to reviewer 108. The device's user-authentication system provides assurance that only reviewer 108 has access to device 158 and that signing 228 is performed using a key available only to reviewer 108.

Signing 202 is implemented by device 158 as sign 202C with HMAC following the steps of FIG. 21. Device 158 reads action-request file 114 from volatile memory. Device 158 accesses key 138A from nonvolatile memory and runs 240C the HMAC signing algorithm to create signature tag 124. Device 158 writes signature tag 124 and participant identifier 128 of reviewer 108 to review signature file 126. The resulting approval package 120 is transferred to action-processing tool 122 running on secure-computing system 100.

Secure-computing system 100 processes approval package 120 in accordance with the steps of action-processing tool 122 described FIG. 6. All steps are performed as previously described, except for validate 236 request-signature file 116 and validate 238 approval-signature file 126 since in the current embodiment, the signature algorithm is HMAC.

Tool 122 uses the validate 212C process to perform validate 236 request-signature file 116, and a second time to perform validate 238 approval-signature file 126. A flow chart for validation 212C is shown in FIG. 22.

The first validation performed by tool 122 is validate 236 request-signature file 116. Tool 122 reads 254 approval package 120, which includes read 256 the participant identifier of the signer, which in this case is requester 106. Also as part of read 254, tool 122 reads 268 signature tag 124. Tool 122 also reads 264A table 152A. The participant identifier of the requester is used to look-up 270 the signer's private key 138A from table 152A. Validate 212C is performed using the signer's private key 138A to run 246C the HMAC signature-verification algorithm to determine whether request-signature file 116 of action-request file 114 is valid.

The second validation performed by tool 122 is validate 238 approval-signature file 126. Tool 122 reads 256 the participant identifier of the signer, which in this case is reviewer 108, and reads 268 signature tag 124. The participant identifier of the requester is used to look-up 270 the signer's private key 138A from table 152A. Private key 138A of the signer is used to run 246C the HMAC signature verification algorithm to determine whether approval-signature file 126 of action-request file 114 is valid.

In addition to validating 236 request-signature file 116 and validating 238 approval-signature file 126, action-processing tool 122 checks 232 to make sure nonce 112 read from action-request file 114 is not present in playback list 134 and compares 234 participant identifier 128 from request-signature file 116 with participant identifier from approval-signature file 126 to make sure they are different. If all criteria pass, tool 122 grants 210 resource request 110. If any criteria does not pass, tool 122 does not grant request 110.

The digital signatures provide assurance of authenticity and integrity, and non-repudiation thereby enabling remote participation from personal mobile devices. Further, the present embodiment illustrates that symmetric-key signature algorithms can be used to provide these assurances.

Extension to Multiple-Person Controls—FIGS. 23-26

The present method of two-person controls can easily be extended to enforce multiple-person controls, where m is the total number of participants who should agree before a resource request 110 is granted. In multiple-person controls, there is still one requester 106, but there should be at least m−1 reviewers 108 who approve resource request 110 before it is granted. For example, the method can be used to enforce three-person controls in which case m is three, where one participant performs the role of requester 106, and two or more participants performing the role of reviewer 108 before a request is granted.

FIG. 23 shows an approval package 120A for multiple-person controls. The only difference between a multiple-person control approval package 120A and two-person control approval package 120 is the number of approval-signature files 126. To meet multiple-person control criteria, signature approval package 120A should have at least m−1 approval signatures from different participants, who are also different from requester 106 to provide assurance that "m" different persons have concurred with resource request 110.

Requesting under multiple-person controls is performed with an action-request tool 130A. The flowchart for tool 130A, shown in FIG. 24, is similar to that of tool 130 for two-person control, being the same until after creating request-signature file 116. At that point, request-tool 130A creates an approval holding folder 160 and inserts a copy of action-request package 118. Instead of distributing 206 action-request package 118 to participants of multiple-person controls, tool 130A distributes 206A a link to approval-holding folder 160 where approval-signatures for a given action-request file 114 are collected.

Reviewing under multiple-person controls is performed with an action-review tool 132A, a flowchart for which is shown in FIG. 25. Multiple-person action-review tool 132A is similar to two-person control action-review tool 132 until after approval-signature file 126 is created. Instead of returning approval package to requester 106 after a single approval, tool 132A collects approval signatures in approval-holding folder 160, by transferring 230A approval-signature files 126 to approval-holding folder 160, until a sufficient number of approval signatures, m−1, are present. Once a sufficient number of approval-signature files 126 are present, which is at least m−1 files, tool 132A notifies 272 requester 106 that the approval package 120A is complete. If the number of approvals present in folder 160 is less than m−1, review tool 132A does not notify 272 requester 108 that approval package is complete.

On receiving notification that approval package 120A is complete, requester 106 can submit a link to approval-holding folder 160 to a multiple-person control action-processing tool 122A. A flowchart for tool 122A is shown in FIG. 26.

Tool 122A reads 254A approval package 120A from folder 160 and processes the package. The nonce check 232 for presence in playback list is the same as for two-person controls. Validating 236 request signature file 116 is also the same as for two-person controls. However, for multiple-person controls, there should be m−1 valid approval signature files. As such, validating 238 approval signature file 126 is replaced with validating 238A m−1 valid signature files 126. Moreover, in addition to checking whether requester 106 has approved his own request, tool 122A should also checks whether any reviewers have submitted multiple approval signatures. As such, tool 122A checks 234A that each signature file, whether a request signature file or an approval signature file, has a participant identifier that is different from each of the other valid signature files. In summary, there should be at least m valid signature files, including one request-signature file 116 and at least m−1 approval-signature files 126, each having a participant identifier that is different from the participant identifiers of the other valid signature files.

The logic of action processing tool 122A can be simplified by disregarding whether a signature is from a reviewer or from a requester and by recognizing that validate 236 (the request signature) and validate 238A (the approval signatures) both use the same generic validate 212 process. The resulting logic, for an alternate multiple-person control action-processing tool 122B is shown in FIG. 27. In this flow, the request signature and the approval signatures are treated the same way. To determine compliance with multiple-person controls, tool 122B counts 274 the number of valid signatures of action-request file 114 that have different signers. The count is designated by the variable i, and multiple-person control rules are satisfied when the count reaches m. Tool compares the total number of valid digital signatures 162, designated by the variable i with the number persons required to concur to satisfy m-person rules, designated by the variable m.

Since count 274 only includes valid signatures with different signers, a requester who signs his own request signature and his own approval signature would have only one valid signature counted. Similarly, if more than one copy of a valid signature is present, only one signature is included in the count. Moreover, a reviewer who approves request file 114 multiple times, only gets credit for one approval by tool 122B. More importantly, if an attacker puts a different participant identifier on a valid signature, tool 122B uses the key of the other participant identifier, which is not consistent with the signing key, causing an invalid signature.

Key management for multiple-person controls can be performed with the same systems used for two-person controls. Signing keys should be kept confidential and be accessible only by the owner. Verification keys should be protected from modification. As with two-person controls, the system should provide assurance that each user has only one participant identifier. Similarly, multiple-person controls can be implemented with either asymmetric-key algorithms or with symmetric-key algorithms.

Multiple-person controls offers a higher level of security than two-person controls. The greater the number of participants who must agree on a resource request, the stronger the protection. For example, with two-person controls, it is possible for a team of two rogue-users to approve each others requests to gain unfettered control of the system. However, three person-controls protects against teams of two rogue users. In general, multiple-person controls protects against up to m−1 rogue users working together as a team. A further security benefit of multiple-person controls is that the additional reviewers reduce the likelihood of accidentally approving resource requests that undermine security or violate policy.

Operation—Two-Person Controls—FIGS. 1-6

This section describes operation for the present method of two-person controls. Several scenarios are presented including a benign-use case, where authorized participant's perform normal tasks requiring privilege elevation. Also presented are several misuse cases, where a rogue user attempts to manipulate the present method to gain unfettered access. The examples assume participants are system administrators whose computer accounts have been configured with limited privileges. Tasks requiring privilege elevation are performed under the present method of two-person controls.

The example scenarios involve three honest system administrators, named Beth, Tom, and Paul, and one malicious system administrator, named Edward. Later, an additional system administrator is added to the team, his name is Bradley. He too is malicious and is in league with Edward. The first scenario is a benign use case, where Beth makes a resource request to delete a portion of a critical database which is needed to remove corrupted data. However, since the resource request could be used to cause serious damage if performed on valid data that has not been backed-up, deleting data is a particularly sensitive task that requires two-person controls. This use case is depicted in FIG. 1, with Beth, the second user from the left, performing the role of requester 106 by invoking action-request tool 130 to request the database deletion task requiring privilege escalation.

Action-request tool 130 prompts Beth to enter her resource request 110, which in the present example specifies the deletion of a particular portion of the database. Tool 130 documents 214 the request by writing it to action-request file 114. Tool 130 creates 216 a nonce 112 and appends 218 nonce to create action-request file 114. With Beth's consent, tool 130 accesses Beth's private key and uses it to digitally sign 220 action-request file 114 to create her signature tag 124. Tool 130 writes Beth's participant identifier 128 and Beth's signature tag 124 to action-request signature file 116, which, when combined with action-request file 114 makes up action-request package 118. Tool 130 distributes 206 action-request package 118 to the other system administrators, Tom, Paul and Edward, using an email attachment. To expedite the request, Beth's email explains the reason for the request with sufficient detail that any reviewer can verify the need to delete the portion of the database.

Any participant who receives Beth's action-request package 118 can invoke action-review tool 132 to participate as reviewer 108. In the present example, Paul, shown as the rightmost person of FIG. 1, is first to receive the package and invoke action-review tool 132. Tool 132 displays the request and prompts Paul to either approve or reject the request. Paul makes a phone call and verifies that part of the database has been corrupted and should be deleted. Paul inspects the resource-request to ensure it will perform the desired deletion for only the corrupted portion of the data base.

Satisfied, Paul approves the request which causes tool 132 to initiate the signature process. Paul accesses his private key and uses it to digitally sign 228 action-request file 114 to create his signature tag 124. Tool 132 writes Paul's participant identifier 128 and signature tag 124 to action-approval signature file 126. Beth's action-request-signature file 116, Paul's approval-signature file 126 and action-request file 114 together make up approval package 120. Tool 132 transfers approval package 120 back to Beth via email attachment.

Once Beth receives the approval package, she can submit it for processing by action-processing tool 122. Since both Beth's and Paul's signatures are valid, the nonce is not in the playback list, and the requester (Beth) and the reviewer (Paul) are different users, tool 122 writes the nonce value to playback list 134 and grants 210 the request, which in this case deletes the corrupted portion of the database.

The system protects against executing a request a second time, even when the request is accidentally approved a second time. Consider the case where Tom and Paul both approve the request at the same time, without knowledge of each other's approval. Beth receives two approval packages that both perform the same action, deleting the database, both with valid approval signatures. However, since action processing tool 122 writes 237 nonce 112 to list 134 when a request is granted, and when processing subsequent approval packages, tool 122 checks 232 playback list 134 for nonce 112, the action request will only be performed once, regardless of how many participants approve the request, and regardless of when an approval package is submitted for processing. As such, regardless of how many times Beth's request is approved, action processing tool 122 will grant the request only one time. There is no danger that re-submitting the approval package will cause a valid database to be deleted. If a reason arises for Beth to delete the database a second time, she can create a second action-request package, which has a new nonce value, and submit that to other participants for review.

To illustrate the protective benefits of the present method, several scenarios are presented involving attempts by Edward, the rogue system administrator, to gain unfettered control of the system. Edward, like Beth, Tom, and Paul, is trusted and has been authorized to participate in two-person controls. This means Edward can create valid request-signature files 116 and valid approval-signature files 126. Like other system administrators, Edward's computer account privileges are limited. As such, Edward attempts to use the present method of two-person controls to accomplish malicious objectives.

In a first attempt, Edward uses action-request tool 130 to make a malicious resource request with a valid signature, making a valid action-request package 118, which is distributed to Beth, Paul and Tom. Both Beth and Paul invoke action-review tool 132 to review Edward's request. Beth, Paul and Tom all recognize the request is malicious, and no one approves the request. Instead they counsel Edward to pay more attention to ensure future requests do not undermine security. Edward's action-request file is not granted since there is no valid approval-signature file.

In a second attempt, Edward uses action-review tool 132 to approve his own malicious resource request. The tool allows him to sign his own approval and create approval package 120. However, when Edward submits the approval package to action-processing tool 122, compare 234 of requester's participant identifier 128 and the reviewer's participant identifier 128 fails, since Edward's participant identifier 128 appears on both signature files. Tool 122 terminates execution without granting the malicious request.

In a third attempt, Edward uses tool 130 to creates a new malicious resource request, and approves it himself using action-review tool 132. However, this time Edward replaces the participant identifier 128 on his request signature file 116 with Tom's participant identifier 128. Even though both signatures were properly signed with Edwards valid private key, action-processing tool 122 fails to validate 236 the request signature since the check is performed using Tom's public key. As such, action-processing tool 122 terminates execution without granting the malicious request.

In a forth attempt, Edward searches for and finds a valid approval package that was used previously to perform an unusual and somewhat dangerous task (e.g. Beth's approval package that deleted part of the database of the first example.) Edward resubmits the approval package in an attempt to cause tool to grant the resource request a second time. Even though the approval package is properly signed, action-processing tool 122 fails the nonce playback check 232 causing the tool to terminate execution without granting the request.

In a fifth attempt, Edward starts with the properly signed approval package used in the fourth attempt. This time Edward changes the value of the nonce before submitting the approval package to action-processing tool 122. However, since the nonce value is part of the signed message, the signature validation check fails causing action-processing tool 122 to terminate execution without granting the request.

In a sixth attempt, Edward finds a properly signed approval package that has not yet been submitted for execution, and modifies the action request to achieve malicious objectives. For example, Edward modifies the resource request 110 to become a malicious resource request. Edward then invokes action-review tool 132 and approves the modified request himself. However, when Edward submits the approval package to action-processing tool 122, even though Edward's approval-signature 126 validates, request-signature file 116 fails to validate since the resource request signed by the requester 106 has been modified. Tool 122 terminates execution without granting the request.

In a seventh attempt, Edward hires a new system administrator named Bradley. Like the other system administrators, Bradley is trusted and authorized to participate in two-person controls. However, Bradley is actually a rogue insider with malicious intent. Moreover, Bradley and Edward discover they have common malicious objectives and decide to work together. With two rogue participants agreeing to create and approve malicious resource requests 110, two-person controls is unable to protect against unfettered access. To prevent collaboration between two persons, a multiple-person control system is needed that requires approval by more than one person.

Operation—Multiple-Person Controls—FIGS. 23-26

This section describes operation for the present method of multiple-person controls. In the examples, m is three, meaning three participants must agree on a resource request before it is granted. As before, the scenarios involve three honest system administrators, named Beth, Tom, and Paul and two malicious system administrators, named Edward and Bradley. The first scenario is a benign use case, where Beth makes a resource request to back-up a copy of customer data. The second use case is a malicious use case, where two rogue participants Edward and Bradley team together in an attempt to gain unfettered access to the system.

The first use case addresses Beth's resource request to create a back-up a copy of the data base. Since Beth's user account has insufficient privilege to perform this action, she uses action-request tool 130A to initiate the request under three-person controls. Tool 130A documents 214 Beth's request, creates 216 nonce 112, appends 218 nonce to resource request 110, signs 220 action-request file 114, creates approval-holding folder 160 and distributes 206A a link to folder 160 to the other system administrators, Tom, Paul, Edward, and Bradley using an email attachment.

Any participant receiving Beth's action-request package 118 can invoke action-review tool 132A to participate as reviewer 108. In the present example, Paul and Edward are the first participants to receive Beth's request link. Paul invokes action-review tool 132A first and decides to approve the request causing the creation of a first approval-signature file 126. Tool 132A checks how many approval-signature files 126 are present in folder 160. Since only Paul has approved the request, there is only one approval-signature file 126 present in folder 160. Under three-person controls, at least two approval-signature files 126 must be present before tool 132A notifies Beth that her request is ready for processing.

Edward also receives Beth's request. In order to appear trusted, Edward also runs action review tool 132A and approves the request since it is consistent with Edward's job. This time, this time there are two approval-signature files 126 present in folder 160 which is sufficient to cause tool 132A to notify Beth that her approval package 120A is present in folder 160 ready for submission to action processing tool 122A.

After Beth receives notification that her request has been approved, Beth submits the link to folder 160 to action-processing tool 122A. Tool 122A reads multiple-person control approval package 120A from folder 160 and performs nonce check 232. Since the nonce has not been previously submitted, check 232 passes. Checks 234A also pass since the participant identifiers on the three signature files (one request-signature file 116 and two approval-signature files 126) are all different. Request-signature file 116 validates since it was signed by an authorized participant (Beth) and it has not been modified. Similarly both approval-signature files 126 validate since they are authentic and unmodified. Having met all criteria, tool 122A writes nonce 112 to playback list 134 and grants 210 request 110. The method grants the request with little impact to work flow while protecting against the insider threat.

A malicious use case involves Edward and Bradley working together in an attempt to cause the system to violate security policy. In the example, Edward and Bradley attempt to get the system to write sensitive data to a thumb drive. Edward invokes action request tool 130A to document his request and create his request-signature file 116. Tool 130A distributes the link to other participants.

Bradley invokes action-review tool 132A and is first to approve the request. However, other users reject the request since there is no legitimate reason to write sensitive data to a thumb drive. Even though Edward submits a link to folder 160 to action-processing tool 122A, validate 238A fails since there should be a least m−1 (two) valid approval-signature files 126. As such, the present method of three-person controls protects against a team of two rogue users who work together to gain unfettered access to the computer system.

These are but a few of the many use cases where the present method protects against rogue insiders. In addition to protecting against the insider threat, the present method also adds protection against external attacks. Since the method can be used to eliminate or at least greatly restrict the number of users who require computer accounts with highest privilege, it also protects against an external attacker who gains access to a system administrator's account, since the hacked account has insufficient privilege to undermine security policy.

CONCLUSIONS, RAMIFICATIONS AND SCOPE

Accordingly, the reader will see that the present method provides numerous advantages. First the present method uses public-key cryptography to translate the problem of enforcing multiple-person control rules into the simpler, easier to manage problem of protecting a small number of files from modification by a single person, namely action-processing tool 122, playback list 134 and, any tools that handle private keys. These simple modification protections can be readily accomplished with existing secure-operating systems by limiting privileges of users and configuring permissions for files requiring protection from modification. The present method also relies on the confidentiality of each participant's private keys used to sign resource requests. Again this is a problem with a variety of mature solutions including secure-operating systems, password based key derivation functions, mobile devices, hardware security modules and smart cards. As such, the present method uses mature security technologies to address one of the most challenging problems with cybersecurity, preventing unfettered access by system administrators.

Resource requests requiring elevated privilege are executed by the action-processing tool, but only after the request has been approved by additional authorized participants. To provide assurance of non-repudiation, integrity and authenticity, resource requests are digitally signed by the requester and one or more reviewers. As such, the well understood security properties of digital signatures provide assurance that reviewers and the requester have approved the same unmodified resource request and neither the request nor the approvals have been forged.

Although the description above contains much specificity, this should not be construed as limiting the scope of the embodiments but as merely providing illustration of example embodiments. For example, action-review tool 132 described in the specification transfers 230 approval package 120 to requester 108. However, alternate embodiments exist in which action-review tool 132 transfers approval package 120 directly to action-processing tool 122 for immediate processing.

While action-processing tool 122 described in the specification is a script that validates signatures and implements security checks before granting resource requests, some or all of the functionality of tool 122 can be incorporated into the operating system. Moreover, to achieve higher levels of security, some, or all of this functionality can be implemented in the kernel of the operating system.

While the embodiments described in the specification use nonce 112 together with playback list 134 to prevent resource requests from being granted a second time (either inadvertently or maliciously), embodiments of the present method exist that do not check 232 whether nonce 112 appears in playback list 134 before granting a request.

While the embodiments described in the specification transfer the entire approval package 120 to the requester, embodiments exist that transfer 230 only approval-signature file 126 to requester 106, since the other components of approval package 120, namely request-signature file 116 and action-request file 114 are already available to requester 106 since they were generated by requester 106.

While the embodiments described in the specification distribute 206 action request package 118, which includes request-signature 116, to authorized participants for review, embodiments exist that distribute 206 only action-request file 114 to reviewers.

While the embodiments described in the specification use several different digital signature algorithms including ECDSA, DSA, and HMAC, additional embodiments exist that use other algorithms such as the Rivest, Shamir, Adelman algorithm (RSA), Lamport signatures, and the Merckle signature scheme. Moreover, embodiments exist that support combinations of different types of digital signature algorithms.

While action-processing tool 122 of the present embodiment does not create an audit log of attempts to process action-approval packages 120, embodiments exist that do create audit logs. Embodiments also exist that create activity logs. For example, embodiments of tool 122 exist that create a log of whether the request was granted, the execution time, and if not granted, the failure criteria.

Although action-review tool 132 described in the specification does not check whether nonce 112 in action-request file 114 is already in playback list 134, embodiments of review tool 132 exist that do perform this check. Moreover, embodiments exist that check whether nonce value 112 is found in list 134, and if found, notify the reviewer that the request has already been rejected or granted. Similarly, while review tool 132 described in the specification does not create a list of nonces from requests that have been reviewed, embodiments exist that do create a "reviewed list" of nonces to document which requests have been reviewed, and by how many reviewers.

Although the multiple-person control participants of the present embodiments are computer users, the method is also suitable for use by other types of entities, such as computer programs. For example, the process of creating a request can be performed by a computer program running on a computing device that uses its own protected private key to create the request signature. Similarly, the process of approving a request can be performed by a computer program running on a computing device, again having its own protected private key for creating the approval signature.

The invention claimed is:

1. A method for determining compliance with multiple-person control rules for a resource request, wherein said compliance provides assurance that a plurality of authorized participants concur with said resource request to protect against insider forgeries, playback attacks, modification attacks, and impersonation attacks, the method, executed on a secure-computing system, comprising:
   a. receiving a message containing said resource request;
   b. receiving two or more digital signature files for said message wherein each digital signature file of said two or more digital signature files includes: a participant identifier and a signature tag, wherein said signature tag is an output of a signing algorithm which takes as input, the message and an authorized participant's private key, and performs a calculation resulting in a cryptographically signed resource request as the output, wherein said authorized participant's private key is bound to an authorized participant's public key, wherein said authorized participant's public key is associated with said participant identifier, wherein the participant identifier determines a respective public key used for validating said digital signature file;

c. accessing a participant database that stores a plurality of participant identifiers and a plurality of public keys, each public key of the plurality of public keys being associated with a respective participant identifier of the plurality of participant identifiers, wherein each participant identifier of the plurality of participant identifiers corresponds to a participant who has been approved to participate in multiple-person controls by enrolling the participant's public key in the participant database;

d. determining validity of each digital signature file of said two or more digital signature files, wherein said determining validity comprises:

reading said participant identifier from said digital signature file;

looking up the respective public key from said participant database that corresponds to said participant identifier read from said digital signature file;

running a signature verification algorithm with inputs being: said message, the looked up public key and said signature tag, wherein said digital signature file is determined to be valid when the message used for the signature verification algorithm is the same message used for creating the signature tag and when the looked up public key used for the signature verification algorithm is said authorized participant's public key, wherein using a different public key for the signature verification algorithm causes said digital signature file to fail to validate, wherein using a different message for the signature verification algorithm causes said digital signature file to fail to validate;

e. counting a number of different said participant identifiers appearing on valid digital signature files determined to be valid in step d; and f. comparing said number of different said participant identifiers appearing on the valid digital signature files with a threshold number wherein said threshold number is two or more and is a configurable parameter for implementing the multiple-person control rules;

whereby the resource request is determined to be compliant with the multiple-person control rules when said number of different said participant identifiers is greater than or equal to said threshold number.

2. The method of claim 1 further comprising granting said resource request based on said determining compliance with multiple-person control rules.

3. The method of claim 1 wherein said secure-computing system uses a secure operating system to limit access to computer resources by said authorized participants whereby resource requests are granted only if determined compliant with the multiple-person control rules.

4. The method of claim 3 wherein said participant database is protected by said secure operating system from modification by said authorized participants.

5. The method of claim 1 wherein said corresponding public key is the participant's private key and said determining validity of said digital signature file is performed with a symmetric-key signature algorithm.

6. The method of claim 1 wherein said participant database is a certificate repository containing digital certificates for said authorized participants.

7. The method of claim 1 wherein said message further includes an appended nonce and further comprising:

a. accessing a playback list containing used nonces read from previously processed messages;

b. reading said appended nonce from said message;

c. checking whether said appended nonce matches any said used nonces in said playback list whereby one or more said matches indicates playback; and d. after said checking whether said appended nonce matches any said used nonces in said playback list, writing said appended nonce to said playback list;

whereby playback of said resource request is determined.

8. The method of claim 7 wherein said determining compliance with multiple-person control rules further includes checking whether said appended nonce matches any said used nonces in said playback list whereby said resource request is determined to be noncompliant with the multiple-person control rules if said nonce matches any said used nonces in said playback list.

9. The method of claim 7 where said playback list is protected from modification by said authorized participants.

10. The method of claim 1 wherein said participant database has no more than one entry for each said authorized participant.

11. The method of claim 1 further including a means for said authorized participant to create a said digital signature file using a private key that is bound to a public key listed in said participant database.

12. The method of claim 11 further including a means of protecting access to said private key.

13. The method of claim 12 wherein said means of protecting access to said private key uses a password-derived key.

14. The method of claim 13 wherein said password-derived private key is computed with password based key derivation function two.

15. The method of claim 12 wherein said means of protecting access to said private key uses a personal security device.

16. A system for determining compliance with multiple-person control rules for granting a resource request, wherein said compliance provides assurance that a plurality of authorized participants concur with said resource request on a secure-computing system, the system comprising:

said secure-computing system;

a memory;

a participant database that stores a plurality of participant identifiers and a plurality of public keys, each public key of the plurality of public keys being associated with a respective participant identifier of the plurality of participant identifiers, wherein each participant identifier of the plurality of participant identifiers corresponds to a participant who has been approved to participate in multiple-person controls by enrolling the participant's public key in the participant database;

action processing programming for said secure-computing system, said action processing programming including instructions to:

a. receive a message containing said resource request and two or more digital signature files of said message, wherein each digital signature file of said two or more digital signature files includes: a participant identifier and a signature tag, wherein said signature tag is an output of a signing algorithm which takes as input, the message and an authorized participant's private key, and performs a calculation resulting in a cryptographically signed resource request as the output, wherein said authorized participant's private key is bound to an authorized participant's public key, wherein said authorized participant's public key is associated with said participant identifier, wherein the participant identifier determines a respective public key used for validating said digital signature file, b. validate each digital signature file of said two or more digital signature files, wherein said validate includes reading said participant identifier from said digital signature file, and accessing said participant database to look up the respective public key corresponding to said participant identifier, and running a signature verification algorithm with inputs being: the looked up public key, said signature tag and said message, to determine whether said digital signature file is valid, wherein said digital signature file is determined to be valid when the message used for the signature verification algorithm is the same message used for creating the signature tag and when the looked up public key used for the signature verification algorithm is said authorized participant's public key, wherein using a different public key for the signature verification algorithm causes said digital signature file to fail to validate, wherein using a different message for the signature verification algorithm causes said digital signature file to fail to validate, c. count a number of different said participant identifiers appearing on valid digital signature files determined to be valid in step b, d. compare said number of different said participant identifiers appearing on the valid digital signature files with a threshold number wherein said threshold number is two or more and is a configurable parameter for implementing the multiple-person control rules;

whereby the resource request is determined to be compliant with the multiple-person control rules when said number of different said participant identifiers is greater than or equal to said threshold number.

17. The system of claim 16 wherein said message further includes an appended nonce, wherein said system further includes a playback list containing used nonces collected from previously processed said messages, and said action processing programming further includes instructions to check whether said appended nonce is present in said playback list; and if present, block said grant of said resource request, and if not present, grant said resource request and write said appended nonce to said playback list, whereby resource requests that have been granted are prevented from being granted subsequent times, unless a sufficient number of authorize participants sign the resource request with a new nonce.

18. The system of claim 16 wherein said participant database is protected from modification by said authorized participants.

19. The system of claim 16 further including one or more resource-request tools responsive to a requester, wherein said requester is an authorized participant who wishes to make a resource request, said resource-request tool comprising:

a. a request processor;
b. an interface whereby said requester specifies an instance of said resource request;
c. request programming for said request processor including instructions to:
  read said instance of said resource request;
  incorporate said instance of said resource request into a request message;
  access a requester's private key;
  compute a requester signature tag of said request message using said requester's private key;
  write the participant identifier of said requester and said requester signature tag to a said digital signature file;
e. a means to distribute said request message to other said authorized participants for review, whereby said resource-request tool creates a resource request and a digital signature file to provide evidence said authorized participant has requested said resource request.

20. The system of claim 19 wherein said request processor is said secure-computing system, a smart card, a mobile device, a hardware security module, a dongle or some combination of said secure-computing system, said smart card, said mobile device, said hardware security module, and said dongle.

21. The system of claim 19 wherein said resource-request tool further comprises a receiving means to receive a password, a personal identification number, or biometric data from said requester, an authentication means for validating a combination of said password, said personal identification number and said biometric data to authenticate access to said requester's private key.

22. The system of claim 19 wherein said resource-request tool further comprises a means to generate a nonce and said request programming further includes writing said nonce to said message.

23. The system of claim 19 further including one or more resource-review tools responsive to a reviewer, wherein said reviewer is an authorized participant, said resource-review tool comprising:

a. a review processor;
b. a means to receive said request message containing said resource request;
c. a means to display said resource request to said reviewer;
d. review programming for said review processor including instructions to:
  extract said resource request from said message;
  display said resource request to said reviewer;
  prompt said reviewer to enter a reviewer decision to either approve or reject said resource request;
  receive said reviewer decision;
  if said reviewer decision is to approve, access a reviewer's private key, and
  compute a reviewer signature tag of said request message using said reviewer's private key; and
  write the participant identifier of said reviewer and said reviewer signature tag to a said digital signature file, whereby said resource-review tool creates a digital signature file to provide evidence said authorized participant has reviewed said resource request and has concurred said resource request is correct.

24. The system of claim 23 wherein said review processor is said secure-computing system, a smart card, a mobile device, a hardware security module, a dongle or some combination of said secure-computing system, said smart card, said mobile device, said hardware security module, and said dongle.

25. The system of claim 23 wherein said resource-review tool further includes a receiving means to receive a password, a personal identification number, or biometric data from said reviewer and an authentication means for validating a combination of said password, said personal identification number, or said biometric data to authenticate access to said reviewer's private key by said reviewer.

26. The system of claim 16 wherein said action processing programming further including instructions to: grant said resource request when determined to compliant with the multiple-person control rules, wherein said resource request is not granted when determined to be not compliant with the multiple-person control rules.

\* \* \* \* \*